United States Patent
Shin et al.

(10) Patent No.: US 10,386,954 B2
(45) Date of Patent: Aug. 20, 2019

(54) ELECTRONIC DEVICE AND METHOD FOR IDENTIFYING INPUT MADE BY EXTERNAL DEVICE OF ELECTRONIC DEVICE

(71) Applicant: Samsung Electronics Co., Ltd, Gyeonggi-do (KR)

(72) Inventors: Eung Seo Shin, Seoul (KR); Dong Hoon Lee, Gyeonggi-do (KR); Sung Koo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 15/286,522

(22) Filed: Oct. 5, 2016

(65) Prior Publication Data
US 2017/0097720 A1   Apr. 6, 2017

(30) Foreign Application Priority Data

Oct. 5, 2015 (KR) .......................... 10-2015-0140015

(51) Int. Cl.
*G06F 3/038*   (2013.01)
*G06F 3/041*   (2006.01)
*G06F 3/044*   (2006.01)
*G06F 3/0354*  (2013.01)

(52) U.S. Cl.
CPC .......... *G06F 3/0416* (2013.01); *G06F 3/0383* (2013.01); *G06F 3/03545* (2013.01); *G06F 3/044* (2013.01); *G06F 3/0412* (2013.01); *G06F 2203/0384* (2013.01); *G06F 2203/04105* (2013.01); *G06F 2203/04106* (2013.01); *G06F 2203/04108* (2013.01)

(58) Field of Classification Search
CPC ... G06F 2203/0384; G06F 2203/04105; G06F 2203/04106; G06F 2203/04108; G06F 3/03545; G06F 3/0383; G06F 3/0412; G06F 3/0416; G06F 3/044
See application file for complete search history.

(56) References Cited

U.S. PATENT DOCUMENTS

| | | | | |
|---|---|---|---|---|
| 8,482,539 B2 * | 7/2013 | Ogawa | ................ | G06F 3/03545 178/18.01 |
| 8,482,545 B2 * | 7/2013 | King-Smith | ........ | G06F 3/03545 345/174 |
| 8,726,158 B2 * | 5/2014 | Kinoshita | ............... | G06F 3/048 715/716 |

(Continued)

FOREIGN PATENT DOCUMENTS

| KR | 10-2013-0104649 | 9/2013 |
|---|---|---|
| KR | 10-2014-0089126 | 7/2014 |

*Primary Examiner* — Michael J Jansen, II

(57) ABSTRACT

An electronic device includes a display including a touch panel for detecting at least one input and a short range communication circuit configured to communicate with an electronic pen for making a pen input to the touch panel. The electronic device also includes a processor that is electrically connected to the touch panel and the short range communication circuit. The processor is configured to obtain information on the pen input through the short range communication circuit and if a difference between a obtainment time of an input to the touch panel and a detection time of information on the pen input corresponds to a time range, the processor determines the input to the touch panel as the pen input.

14 Claims, 12 Drawing Sheets

(56) References Cited

U.S. PATENT DOCUMENTS

| | | | | |
|---|---|---|---|---|
| 8,739,074 B2* | 5/2014 | Kinoshita | | G06F 3/0488 |
| | | | | 715/716 |
| 8,928,634 B2 | 1/2015 | Hsu | | |
| 8,997,015 B2* | 3/2015 | Kinoshita | | G06F 3/0416 |
| | | | | 715/781 |
| 9,075,471 B2* | 7/2015 | Choi | | G06F 3/0412 |
| 9,116,571 B2* | 8/2015 | Zeliff | | G06F 3/044 |
| 9,261,990 B2* | 2/2016 | Choi | | G06F 3/041 |
| 9,342,162 B2* | 5/2016 | Song | | G06F 3/04883 |
| 9,367,185 B2* | 6/2016 | Sasselli | | G06F 3/0416 |
| 9,367,186 B2* | 6/2016 | Sasselli | | G06F 3/0416 |
| 9,406,280 B2* | 8/2016 | Ota | | G09G 5/12 |
| 9,513,719 B2* | 12/2016 | Ito | | G06F 3/044 |
| 9,626,010 B2* | 4/2017 | Yoon | | G06F 3/0433 |
| 2010/0085325 A1* | 4/2010 | King-Smith | | G06F 3/03545 |
| | | | | 345/174 |
| 2010/0095205 A1* | 4/2010 | Kinoshita | | G06F 3/0416 |
| | | | | 715/702 |
| 2011/0154228 A1* | 6/2011 | Kinoshita | | G06F 3/0488 |
| | | | | 715/763 |
| 2011/0167363 A1* | 7/2011 | Kinoshita | | G06F 3/048 |
| | | | | 715/763 |
| 2011/0169756 A1* | 7/2011 | Ogawa | | G06F 3/03545 |
| | | | | 345/173 |
| 2012/0013555 A1* | 1/2012 | Maeda | | G06F 3/03545 |
| | | | | 345/173 |
| 2012/0169663 A1* | 7/2012 | Kim | | G06F 3/0418 |
| | | | | 345/174 |
| 2012/0182270 A1 | 7/2012 | Hsu | | |
| 2012/0206417 A1* | 8/2012 | Lee | | G06F 3/03545 |
| | | | | 345/177 |
| 2013/0050141 A1* | 2/2013 | Park | | G06F 3/0488 |
| | | | | 345/174 |
| 2013/0222294 A1* | 8/2013 | Choi | | G06F 3/041 |
| | | | | 345/173 |
| 2013/0257793 A1* | 10/2013 | Zeliff | | G06F 3/044 |
| | | | | 345/174 |
| 2013/0278554 A1* | 10/2013 | Ide | | G06F 3/044 |
| | | | | 345/174 |
| 2014/0152576 A1* | 6/2014 | Kim | | G06F 3/03545 |
| | | | | 345/169 |
| 2014/0168116 A1* | 6/2014 | Sasselli | | G06F 3/0416 |
| | | | | 345/173 |
| 2014/0168140 A1* | 6/2014 | Sasselli | | G06F 3/0416 |
| | | | | 345/174 |
| 2014/0168141 A1* | 6/2014 | Sasselli | | G06F 3/0416 |
| | | | | 345/174 |
| 2014/0168142 A1* | 6/2014 | Sasselli | | G06F 3/0416 |
| | | | | 345/174 |
| 2014/0191983 A1 | 7/2014 | Choi et al. | | |
| 2014/0210744 A1* | 7/2014 | Song | | G06F 3/03545 |
| | | | | 345/173 |
| 2014/0247238 A1* | 9/2014 | Chang | | G06F 3/044 |
| | | | | 345/174 |
| 2014/0267102 A1* | 9/2014 | Ota | | G09G 5/12 |
| | | | | 345/173 |
| 2015/0022467 A1* | 1/2015 | Takayama | | G06F 3/03545 |
| | | | | 345/173 |
| 2015/0035807 A1* | 2/2015 | Ito | | G06F 3/03545 |
| | | | | 345/179 |
| 2015/0103014 A1* | 4/2015 | Kim | | G06F 3/03545 |
| | | | | 345/173 |
| 2015/0138123 A1* | 5/2015 | Yoon | | G06F 3/0433 |
| | | | | 345/173 |
| 2015/0185923 A1* | 7/2015 | Yoon | | G06F 3/044 |
| | | | | 345/174 |
| 2016/0282964 A9* | 9/2016 | Kim | | G06F 3/03545 |
| 2017/0097720 A1* | 4/2017 | Shin | | G06F 3/03545 |
| 2017/0115792 A1* | 4/2017 | Nishimura | | G06F 3/0414 |

* cited by examiner

ELECTRONIC DEVICE AND METHOD FOR IDENTIFYING INPUT MADE BY EXTERNAL DEVICE OF ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed on Oct. 5, 2015 in the Korean Intellectual Property Office and assigned Serial number 10-2015-0140015, the entire disclosure of which is hereby incorporated by reference.

TECHNICAL FIELD

The present disclosure relates to a method and a device for identifying a type of an input.

BACKGROUND

Various types of electronic products have been developed and distributed thanks to the development of the electronic technologies. Recently, electronic devices, such as smartphones and/or tablet PCs, including a touchscreen display have been increasingly distributed.

A touch input to a touchscreen display of an electronic device, for example, may be made by a finger of the user. As another example, an electronic pen such as a stylus may be utilized for a more precise input. Electronic pens may be classified into an active type and a passive type. The active pen, for example, may provide various functions such as hovering, detection of a tip-pressure, an erasing, or palm rejection.

The electronic device that supports an active pen may include an extra resource (for example, hardware or software) for recognizing or processing a pen input. For example, the electronic device may include hardware (for example, an EMR (electromagnetic resonance) pad), such as a sensor or a controller. Accordingly, the price of the electronic device may increase to support the active pen. Further, it may be difficult to slim the electronic device due to an additional piece of hardware, such as a sensor or a controller.

SUMMARY

To address the above-discussed deficiencies, it is a primary object to provide a method and an electronic device for identifying (distinguishing) a type of an input that is received from the outside without using an extra resource. Further, another aspect of the present disclosure is to provide a method and an electronic device for displaying an input to the electronic device through a display.

In accordance with an aspect of the present disclosure, there is provided an electronic device including a display, a short range communication circuit for communicating with an external electronic device, and a processor that is functionally connected to at least one of the display or the short range communication circuit, wherein the processor may be configured to obtain a first input through the display, to obtain a second input from the external electronic device through the short range communication circuit, when a first piece of attribute information corresponding to the first input and a second piece of information corresponding to the second input satisfy a specific condition, to display the second input as an input related to the external electronic device through the display, and when the first piece of attribute information corresponding to the first input and the second piece of attribute information corresponding to the second input do not satisfy the specific condition, not to display the second input as an input related to the external electronic device through the display.

In accordance with another aspect of the present disclosure, there is provided an electronic device including a display including a touch panel for detecting at least one input, a short range communication circuit configured to communicate with an electronic pen for making a pen input to the touch panel, wherein a processor that is electrically connected to the touch panel and the short range communication circuit, and the processor is configured to obtain information on the pen input through the short range communication circuit, and if a difference between a detection time of an input to the touch panel and an obtainment time of information corresponds to a time range, determine the input to the touch panel as the pen input.

In accordance with another aspect of the present disclosure, there is provided a storage medium that stores a program for executing an operation of obtaining a first input through a display functionally connected to an electronic device, an operation of obtaining a second input through a short range communication circuit functionally connected to the electronic device from an external electronic device, an operation of, when a first piece of attribute information corresponding to the first input and a second piece of information corresponding to the second input satisfy a specific condition, displaying the second input as an input related to the external electronic device through the display, and an operation of, when the first piece of attribute information corresponding to the first input and the second piece of attribute information corresponding to the second input do not satisfy the specific condition, not displaying the second input as an input related to the external electronic device through the display.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
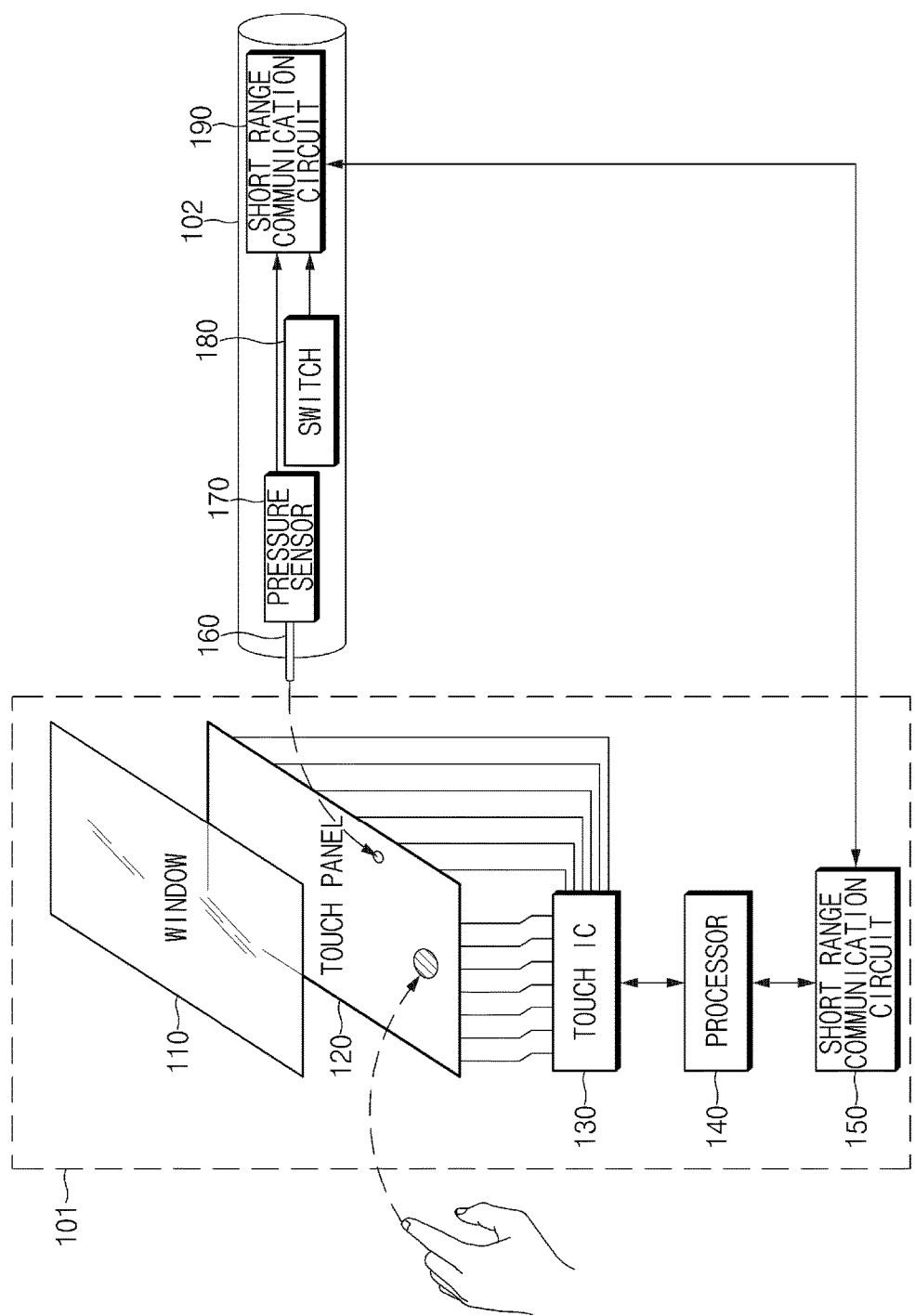
FIG. 1 illustrates a configuration of an electronic device according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacitance to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, SAMSUNG HOMESYNC™, APPLE TV®, or GOOGLE TV®), a game console (for example, XBOX® or PLAYSTATION®), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MM) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates a configuration of an electronic device according to various embodiments of the present disclosure.

Referring to FIG. 1, the electronic device 101, for example, may include a window 110 (for example, a touch glass), a touch panel 120, a touch integrated circuit (IC) 130, a processor 140, and a short range communication circuit 150. The electronic device 101 may receive a user input based on a change in a capacitance generated by an electronic pen 102 or another conductor (for example, a finger of the user), may determine the received input as a pen input or a touch input, and may execute a specific function according to the input type.

Throughout the specification, a pen input, for example, may refer to an input, which is made by an electronic pen 102, of inputs detected by the touch panel 120.

Throughout the specification, a touch input, for example, may refer to an input, which is made by an object (a part of the body of the user) other than the electronic pen 102, of inputs detected by the touch panel 120.

The electronic device 101 may execute different functions for a pen input and a touch input.

The window 110, for example, may be formed on a front surface of the electronic device 101 to have a plate shape. The window 110 may protect other components provided under or below the window 110. The window 110 may be formed of a transparent material. The window 110, for example, may be formed of a material such as tempered glass, a plastic (for example, PET), or an aluminum oxide. The user of the electronic device 101 may apply a touch input to the electronic device 101 by bringing a conductor such as the electronic pen 102 or a finger into contact with the upper side of the window 110. In an embodiment, the window 110 may have a shape (for example, curved glass) that is curved or bent to surround at least a portion of a side surface of the electronic device 101.

The touch panel 120, for example, may detect an approach of a conductor to the touch panel 120. The touch panel 120 may detect a plurality of inputs that are generated substantially simultaneously or sequentially. The touch panel 120 may detect an input by a conductor, such as a finger of the user, and may detect an input by the electronic pen 102. The touch panel 120, for example, may be a capacitive touch panel. In the case where a contact of the electronic pen 102 or a finger of the user is made through the window 110, a signal by a change in an electric charge may be generated at a point of the touch panel 120 at which a contact is made. Because a separate panel for the electronic pen 102 is not necessary as the touch panel 120 detects an input by the electronic pen 102, manufacturing costs of the electronic device 101 may be reduced.

The touch IC 130, for example, may receive a signal that is generated by an input from the touch panel 120. The touch IC 130, for example, may receive a signal that is generated by a change in an electric charge of the touch panel 120. The touch IC 130 may obtain at least one of coordinate information, area information, or electric a change in an electric charge information for the input based on the signal received from the touch panel 120. The touch IC 130 may obtain time information of a time at which the signal is received from the touch panel 120.

The short range communication circuit 150, for example, may communicate with the electronic pen 102 that may make a pen input to the touch panel 120. When a pen input is made to the touch panel 120 by the electronic pen 102, the short range communication circuit 150 may receive information on the pen input from the electronic pen 102. The information on the pen input may include an input related to an intensity of a contact between the window 110 (or a display) and the electronic pen 102. For example, the information on the pen input may include a pressure (for example, a tip-pressure) of the pen input. The tip-pressure may be a pressure that is applied to a tip of the electronic pen 102 in contact with the window 110. The information on the pen input may include switch state information that is related to an input for a switch (for example, a switch 180) of the electronic pen 102. The information on the pen input may include time information on a time at which pressure information or switch state information is obtained.

The short range communication circuit 150, for example, may be a BLUETOOTH® circuit. However, in another embodiment, the short range communication circuit 150 may correspond to a circuit that supports communication such as near field communication (NFC), WI-FI DIRECT®, or Bluetooth low energy (BLE).

The processor 140, for example, may be electrically or functionally connected to the touch panel 120, the touch IC 130, and/or the short range communication circuit 150.

According to an embodiment, the processor 140 may obtain information of an input to the touch panel 120 from the touch IC 130. The processor 140 may obtain a detection time of the input based on the information received from the touch IC 130. The processor 140 may obtain information on coordinates or an area of the input or a change in an electric charge based on the information received from the touch IC 130.

According to an embodiment, the processor 140 may obtain information (for example, tip-pressure information) on the pen input from the electronic pen 102 through the short range communication circuit 150. The processor 140 may detect an obtainment time of the information on the pen input.

According to an embodiment, if a difference between a detection time (for example, a first piece of attribute information) of the input to the touch panel 120 and an obtainment time (for example, a second piece of attribute information) of information of a pen input falls within a specific range, the processor 140 may determine the input as a pen input. That is, the processor 140 may determine an input that is detected within a specific time range from the obtainment time of the information on the pen input as a pen input. When a pen input by the electronic pen 102 is made, the processor 140 may receive information on a coordinate or an area of the pen input through the touch panel 120, and may receive information on the pen input including pressure information through the short range communication circuit 150. Accordingly, the processor 140, for example, may compare a detection time of an input through the touch panel 120 with a time of an obtainment of information through the communication circuit 150 and may determine whether the input corresponds to a pen input.

According to an embodiment, if a difference between a detection time of the input to the touch panel 120 and an obtainment time of information on a pen input does not fall within a specific range, the processor 140 may determine the input to the touch panel 120 as a touch input.

According to an embodiment, if a plurality of inputs to the touch panel 120 are obtained, the processor 140 may determine an input to the touch panel 120, which is obtained at a time closest to the obtainment time of the information on the pen input, of the plurality of inputs as a pen input. For example, the processor 140 may determine an input, which has the smallest difference, of the plurality of inputs as a pen input by comparing detection times (for example, a first piece of attribute information) of the plurality of inputs with an obtainment time (for example, a second piece of attribute information) of information of a pen input. When the electronic device 101 supports a multi-touch, the processor 140, for example, may detect a plurality of inputs within a specific time range from the obtainment time of the information on the pen input. Accordingly, the processor 140 may determine an input, which is obtained at a time closest from the obtainment time of the information on the pen input, of the inputs detected within the specific time range as a pen input.

According to an embodiment, if an input area (for example, a first piece of attribute information) of an input to the touch panel 120 corresponds to a specific area range, the processor 140 may determine the input to the touch panel 120 as a pen input. The area of the pen input by the electronic pen 102 may be smaller than an area of a touch input by a finger of the user or the like. Accordingly, when the input area of the input is smaller than a specific area, the processor 140 may determine the input as a pen input.

According to an embodiment, the processor 140 may determine whether the input to the touch panel 120 is a pen input, based on a change in an input area from a time at which the input is pressed to a time at which the input is released. For example, the processor 140 may determine the input as a pen input only when the input area of the input does not change from the press time to the release time. The pen input by the electronic pen 102 may be made to have a uniform area from an initial contact time to a contact release time, unlike a touch input by a finger or the user or the like. Accordingly, when the input area does not change, the processor 140 may determine the input as a pen input.

According to an embodiment, if the input area of the input to the touch panel 120 does not correspond to a specific area range (for example, a first area range) or corresponds to another range (for example, a second area range) that is different from the specific area range, the processor 140 may determine the input as a touch input. If the input also exceeds the second area range (for example, an intended touch input by a palm or the like), the processor 140 may ignore the input.

According to an embodiment, the processor 140 may execute different functions in correspondence to a pen input and a touch input, respectively. For example, the processor 140 may execute a drawing function according to an input if the input is determined to be a pen input, and may execute a screen scroll function according to an input if the input is determined to be a touch input. The processor 140, for example, may execute different functions for the pen input and the touch input, respectively, by distinguishing the input received through the touch panel 120 into a pen input and a touch input.

According to an embodiment, the processor 140 may output a pen input on a display by using an input and/or pressure information. For example, the processor 140 may output a pen input having a thickness that is proportional to a magnitude of a pressure according to a locus of an input on a display functionally connected to the electronic device 101.

According to an embodiment, the processor 140 may delete or ignore a pen input that is output on a display by using an input to the touch panel 120 and/or switch state information. For example, if the switch state information is received, the processor 140 may delete the pen input that is output on a locus of the input from the display or ignore the pen input.

According to an embodiment, if a change in an electric charge in the touch panel 120 by an input to the touch panel 120 corresponds to a specific change range, the processor 140 may determine the input to the touch panel 120 as a hovering input. The change in an electric charge in the touch panel 120 may change even when a conductor approaches the window within a specific distance without directly contacting the window. Accordingly, the processor 140 may determine an input that causes a change (for example, the change is smaller than a change in an electric charge when the conductor directly contacts the window) in a change in an electric charge in a specific range as a hovering input.

According to an embodiment, the processor 140 may change a specific time range based on a different between an input detecting time and a time at which information on a pen input is obtained. For example, the processor 140 may increase the specific time range if a difference between a time at which an input related to the input determined to be a pen input is detected and a time at which information on a pen input is obtained is greater than the specific time range, and may decrease the specific time range if the difference is smaller than the specific time range.

According to an embodiment, the processor 140 may change a specific area range based on the input area of the input to the touch panel 120. For example, the processor 140 may increase the specific area range if the input area of the input is greater than the specific area range, and may decrease the specific area range if the input area if smaller than the specific area range.

According to an embodiment, the processor 140 may change the time range and/or the area range, based on an external input (for example, a user input or an input received from an external device). For example, the processor 140 may receive a user input (for example, a touch or a pen input) by using a user interface that is displayed on a display, and may change a default value of the specific time and/or the specific area, based on value information (for example, a value) that is received through the user input.

According to an embodiment, the processor 140 may set a threshold value in the specific time range and/or the specific area range. For example, when the specific time and/or the specific area is changed by an external input, the processor 140 may not perform an operation of changing the specific time and/or the specific area, based on the threshold value. For example, when the threshold value is a first value (for example, 4 cm$^2$) and the threshold value is changed to a second value (for example, 5 cm$^2$) that is greater than the first value, the changing operation may not be performed, and an alarm (for example, a popup) that represents that the specific time and/or the specific area is not changed may be displayed through the display. Further, when the threshold value is changed to a third value (for example, 3 cm$^2$) that is smaller than the first value is changed by an external input, the processor 140 may perform the changing operation. Further, an alarm (for example, a popup) that represents that the specific time and/or the specific area is changed may be di splayed through the display.

According to various embodiments, although not illustrated in FIG. 1, the electronic device 101 may include a pressure sensor that detects a touch input that is made by a finger of the user or the like and a pressure that is generated by a pen input. If an input is made to the touch panel 120, the pressure sensor of the electronic device 101 may detect a pressure that is generated by the input. The information on the pressure detected by the pressure sensor of the electronic device 101 may be delivered to the processor 140.

The electronic pen 102, for example, may include a conductor 160, a pressure sensor 170, a switch 180, and/or a short range communication circuit 190. The electronic pen 102 may apply an input to the touch panel 120 of the electronic device 101. The electronic pen 102 may deliver information to the short range communication circuit 150 of the electronic device 102.

The conductor 160, for example, may approach the window 110 of the electronic device 101 to change a change in an electric charge that is detected by the touch panel 120. According to an embodiment, when the conductor 160 contacts the window 110, a contact area of the conductor 160 may be smaller than a contact area of another conductor such as a finger of the user or the like.

The pressure sensor 170, for example, may detect a pressure that is applied through the conductor 160 when the conductor 160 contacts the window 110. According to an embodiment, the pressure sensor 170 may include a capacitor. For example, if a distance between two electrodes of the capacitor is changed by a pressure applied through the conductor 160, the pressure sensor 170 may detect a pressure through the conductor 160 by detecting a change in a capacitance of the capacitor. The information on the pressure detected by the pressure sensor 170 may be transmitted to the electronic device 101.

The switch 180, for example, may be changed into an on state or an off state through manipulation of the user. The switch 180 may include a button that may manipulated by the user. According to a state of the switch 180 at a time at which a pen input is input to the electronic device 101, different functions may be executed by a pen input to the electronic device 101. The information on the state of the switch 180 may be transmitted to the electronic device 101.

The short range communication circuit 190, for example, may perform communication with the electronic device 101. The short range communication circuit 190 may communicate with the short range communication circuit 150 of the electronic device 101. The short range communication circuit 190 may transmit information on a pen input to the electronic device 101. For example, the short range communication circuit 190 may transmit pressure information detected by the pressure sensor 170 to the electronic device 101 or switch state information indicating a state of the switch 180. As another example, the short range communication circuit 190 may transmit time information on a time at which pressure information or switch state information is obtained to the electronic device 101. The short range communication circuit 190, for example, may include a Bluetooth circuit.

As not illustrated in FIG. 1, the electronic pen 102 may further include a controller that controls the pressure sensor 170, the switch 180, and the short range communication circuit 190.

Figure 2:
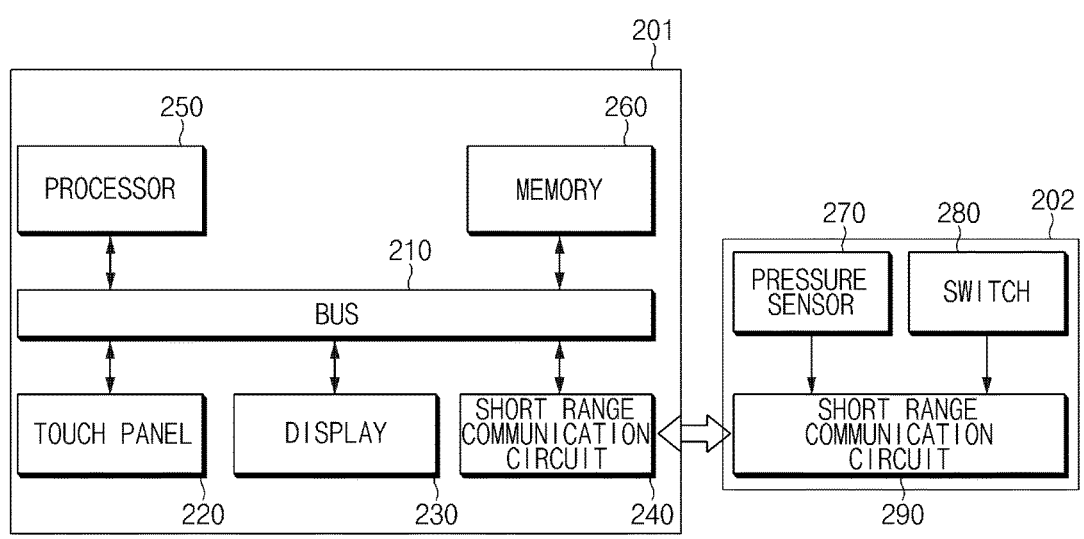
FIG. 2 illustrates a configuration of an electronic device according to various embodiments of the present disclosure.

FIG. 2 illustrates a configuration of an electronic device according to various embodiments of the present disclosure.

Referring to FIG. 2, the electronic device 201 may include a bus 210, a touch panel 220, a display 230, a short range communication circuit 240, a processor 250, and/or a memory 260.

The bus 210, for example, may include a circuit that connects the touch panel 220, the display 230, the short range communication circuit 240, the processor 250, and/or the memory 260 to each other and transmits communication (for example, a control message and/or data) of the touch panel 220, the display 230, the short range communication circuit 240, the processor 250, and/or the memory 260.

The touch panel 220 may use at least one of, for example, a capacitive type, a resistive type, an infrared type, and an ultrasonic type. The touch panel 220 may further include a control circuit such as the touch IC 130 of FIG. 1.

The display 230, for example, may include a liquid crystal display, a light emitting diode display, an organic light emitting diode display, a micro electromechanical system display, or an electronic paper display. The display 230, for example, may display a pen input by using the information that is received from the touch panel 220 and/or the short range communication circuit 240. Although it is illustrated in FIG. 2 that the display 230 and the touch panel 220 have separate configurations, the present disclosure is not limited thereto and the display 230 may include a touch panel for receiving a touch input and a pen input.

The short range communication circuit 240, for example, may set communication between the electronic device 201 and the external electronic device 202. The short range communication circuit 240 may communicate with the external electronic device 202 through a short range communication. The short range communication circuit 240, for example, may be a WI-FI® circuit, a BLUETOOTH® circuit, or an NFC circuit. The short range communication circuit 240 may include a processor for processing data that are transmitted and received.

The processor 250, for example, may execute calculations or data processing of a control and/or communication of the bus 210, the touch panel 220, the display 230, the short range communication circuit 240, and/or the memory 260. The processor 250 may control a plurality of hardware or software elements connected to the processor 250 by driving a program module stored in the memory 260 to process various data and perform calculations. The processor 250, for example, may be implemented by a System on Chip (SoC). For example, the processor 250 may control a short range communication circuit driver 310, a pen driver 320, a touch panel driver 330, an input device driver 340, an input platform 350, an ink platform 355, and/or an application illustrated in FIG. 3.

The memory 260, for example, may include a volatile memory and/or a nonvolatile memory. The memory 260, for example, may store instructions or data related to the electronic device 201 and the external electronic device 202. The memory 260, for example, may store the short range communication circuit driver 310, the pen driver 320, the touch panel driver 330, the input device driver 340, the input platform 350, the ink platform 355, and/or the application illustrated in FIG. 3.

The external electronic device 202, for example, may include a pressure sensor 270, a switch 280, and a short range communication circuit 290. The external electronic device 202 may be one of various devices that may apply an input to the touch panel 220 of the electronic device 201 and may transmit information on a pressure to the electronic device 201. The external electronic device 202, for example, may be the electronic pen 102 illustrated in FIG. 1.

The pressure sensor 270, for example, may convert the measured or detected pressure information into an electrical signal when the external electronic device 202 and the electronic device 201 contact each other. The pressure sensor 270 may detect pressure information through a mechanical or electrical manner. The pressure sensor 270 may further include a control circuit.

The switch 280, for example, may include a physical button, an optical key, or a keypad that may receive an input through manipulation of the user.

The short range communication circuit 290, for example, may set communication between the external electronic device 202 and the electronic device 201. The short range communication circuit 290 may communicate with the electronic device 201 through short range communication. The short range communication circuit 290, for example, may be a WI-FI® circuit, a BLUETOOTH® circuit, or an NFC circuit. The short range communication circuit 290 may include a processor for processing data that are transmitted and received.

Figure 3:
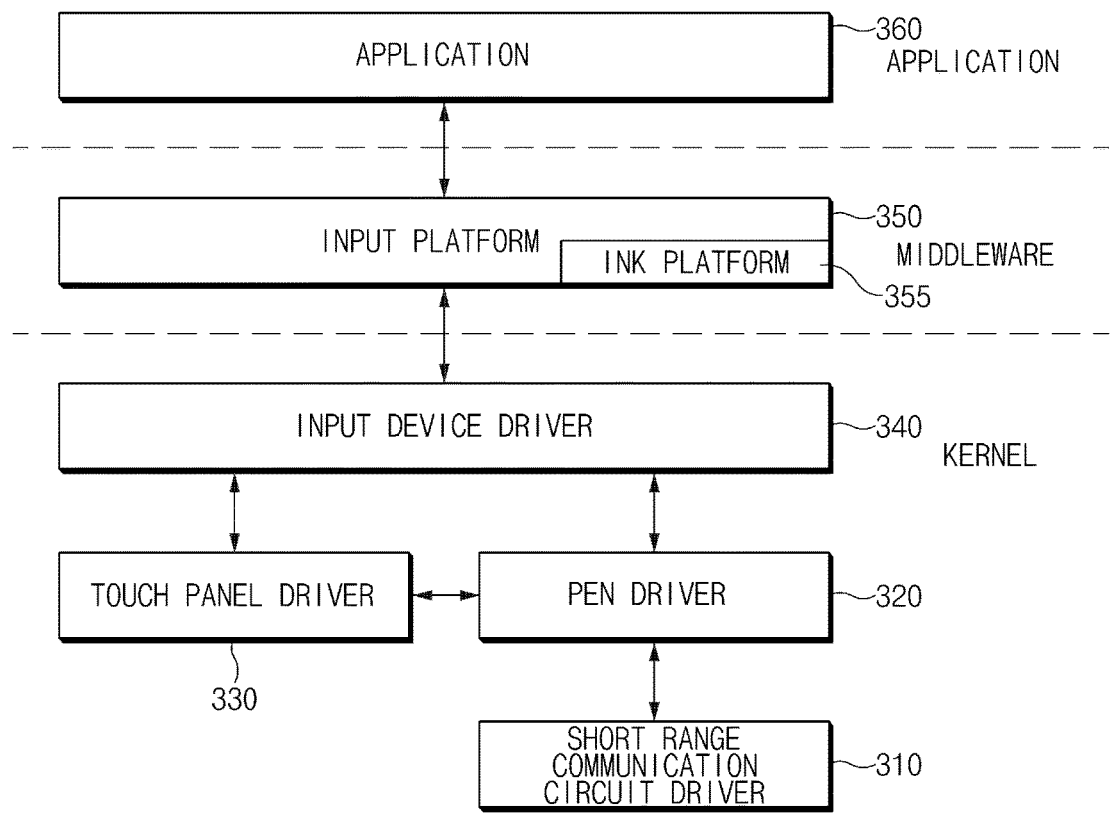
FIG. 3 illustrates a program module that is executed by an electronic device according to various embodiments of the present disclosure.

FIG. 3 illustrates a program module that is executed by an electronic device according to various embodiments of the present disclosure.

Referring to FIG. 3, the program module may include a short range communication circuit driver 310, a pen driver 320, a touch panel driver 330, an input device driver 340, an input platform 350, an ink platform 355, and an application 360.

The short range communication circuit driver 310, for example, may control a short range communication circuit. The short range communication circuit driver 310 may receive information on a pen input through the short range communication circuit. For example, the short range communication circuit driver 310 may receive information on a pen input from the electronic pen after the electronic device and the electronic pen are paired through short range communication. The short range communication circuit driver 310 may change the information on a pen input and may deliver the changed information to the pen driver 320. For example, the short range communication circuit driver 310 may deliver the information on the received pen input to the pen driver 320 through socket communication. For example, when the short range communication circuit driver 310 is a BLUETOOTH® driver, the pressure information or the switch state information may be included in a payload part of a BLUETOOTH® packet.

The pen driver 320, for example, may receive the pressure information or the switch state information from the short range communication circuit driver 310. The pen driver 320 may deliver the reception of the pressure information to the touch panel driver 330 in response to the reception of the pressure information. The pen driver 320 may deliver the pressure information to the touch panel driver 330.

The touch panel driver 330, for example, may process a pen input and a touch input other than the pen input as a same or similar input event. The touch panel driver 330 may receive information on a coordinate and/or an area at or in which an input is made.

When the reception of the pressure information from the pen driver 320 is identified, for example, the touch panel driver 330 may determine an input that is received within a specific time range from the delivery time as a pen input. The touch panel driver 330 may determine an input that is received at a time closest to the delivery time as a pen input. The touch panel driver 330 may determine an input that has an input area smaller than the specific range as a pen input. The touch panel driver 330 may deliver coordinate information of the input that has been determined to be a pen input to the pen driver 320.

When a multi-touch is supported, the touch panel driver 330, for example, may provide an ID to the received input and manage the received input. The touch panel driver 330 may continuously track the ID of the input determined to be a pen input. For example, the touch panel driver 330 may track the ID of the input determined to be a pen input, based on the input area. The touch panel driver 330 may deliver coordinate information of the input corresponding to the tracked ID to the pen driver 320. A processing time of the input may be reduced by tracking the ID of the input when continuous inputs are received.

The touch panel driver 330, for example, may receive information on a change in an electric charge by an input together with information on a coordinate and/or an area in which the input is made. The touch panel driver 330 may determine whether the input is a hovering input, based on the information on the change in an electric charge. For example, the touch panel driver 330 may determine the input as a hovering input when the change in an electric charge corresponds to a specific change range. The touch panel driver 330 may deliver coordinate information by which a hovering input may be identified to the pen driver 320, together with the coordinate information.

According to various embodiments, although not illustrated in FIG. 3, the program module may include a pressure sensor driver. When a touch input or a pen input is applied, the pressure sensor driver may receive information on a pressure detected by a pressure sensor of the electronic device 101. The pressure sensor driver may deliver information on a pressure to the input device driver 340.

The input device driver 340, for example, may receive information from the pen driver 320 and/or the touch panel driver 330. The input device driver 340, for example, may include a human interface device (HID). The input device driver 340 may recognize various external input protocols (for example, a touch, a keyboard, or a mouse) and perform functions related to the recognized protocol, by using the HID. For example, the input device driver 340 may receive information on a coordinate of a pen input, a pressure, a switch state, or hovering from the pen driver 320. For example, the input device driver 340 may receive information on a coordinate of a touch input from the touch panel driver 330. The input device driver 340 may convert a format of the received information into a form by which the received information may be properly delivered to an input platform 350 or an ink platform 355. The input device driver 340 may deliver the information received from the pen driver 320 and/or the touch panel driver 330 to the input platform 350 or the ink platform 355 according to the reception sequence. For example, the input device driver 340 may deliver the information on the pen input received from the pen driver 320 to the ink platform 355 and may deliver the information on the touch input received from the touch panel driver 330 to the input platform 350. Different functions may be executed to correspond to a pen input and a touch input, respectively, by delivering the information on the pen input and the information on the touch input to different platforms.

The input platform 350, for example, may process information on the touch input and may deliver the processed information to the application 360 through an application programming interface (API). The input platform 350 may include a platform that is provided by an operating system. The input platform 350 may execute a function corresponding to a touch input, for example, a function such as selection, scroll, or call of a menu, through the application 360.

The ink platform 355, for example, may process information on the pen input and may deliver the processed information to the application 360 through an application programming interface (API). The ink platform 355 may include a platform that is provided by an operating system. The ink platform 355 may execute a function corresponding to a pen input, for example, a function such as drawing or an eraser through the application 360.

All applications that intend to use the function of the electronic pen may be provided with the function of the electronic pen through the input platform 350 or the ink platform 355 provided by the operating system.

The application 360 may include various application programs that may be installed in the electronic device. The application 360 may include a preloaded application or a third party application that may be downloaded from a server. The application 360 may execute a function corresponding to a touch input by using the information received through the input platform 350, and may execute a function corresponding to a pen input by using the information received through the ink platform 355.

According to an embodiment, although all the elements (for example, the processor 140, the processor 250, and the memory 260) of the electronic device 101 are included in the electronic device 101, various embodiments are not limited thereto. For example, according to the role, function, or performance of the electronic device 101, at least some of the elements of the electronic device 101 may distributed to the electronic device 101 and an external electronic device (for example, the first electronic device 101, the second electronic device 104, or the server 106 of FIG. 10).

According to various embodiments, at least some of the short range communication circuit driver 310, the pen driver 320, the touch panel driver 330, the input device driver 340, the input platform 350, the ink platform 355, or the application 360 may be implemented by software, firmware, hardware, or a combination of one or more thereof. For example, at least some of the short range communication circuit driver 310, the pen driver 320, the touch panel driver 330, the input device driver 340, the input platform 350, the ink platform 355, or the application 360 may be executed by a processor (for example, the processor 140). At least some of the short range communication circuit driver 310, the pen driver 320, the touch panel driver 330, the input device driver 340, the input platform 350, the ink platform 355, or the application 360, for example, may include a module, a program, a routine, a set of instructions, or a process for performing one or more functions.

An electronic device according to an embodiment of the present disclosure may include a display, a short range communication circuit for communicating with an external electronic device, and a processor that is functionally connected to at least one of the display or the short range communication circuit, and the processor may be configured to obtain a first input through the display, to obtain a second input from the external electronic device through the short range communication circuit, when a first piece of attribute information corresponding to the first input and a second piece of information corresponding to the second input satisfy a specific condition, to display the second input as an input related to the external electronic device through the display, and when the first piece of attribute information corresponding to the first input and the second piece of attribute information corresponding to the second input do not satisfy the specific condition, not to display the second input as an input related to the external electronic device through the display.

According to another aspect of the present disclosure, the second input may include an input related to an intensity of a contact between the display and the external electronic device.

According to another aspect of the present disclosure, the input related to the intensity of the contact may include a tip-pressure, and the tip-pressure may include a pressure related to a tip of the external electronic device.

According to another aspect of the present disclosure, the first piece of attribute information may include a time at which the first input is made, an area of the first input, a change in an electric charge for the first input measured by the display, or a combination thereof, and the second piece of attribute information may include a time at which the second input is made.

According to another aspect of the present disclosure, the specific condition may be that a difference value between a time at which the first input is made and a time at which the second input is made may fall within the specific range.

According to another aspect of the present disclosure, the first input may include a plurality of inputs, and the processor may be configured to determine the second input as an input related to the external electronic device, based on the areas of the plurality of first inputs.

According to another aspect of the present disclosure, the processor may be configured to determine an input, of which an area is small, of the plurality of first inputs as an input related to the external electronic device.

An electronic device according to an embodiment of the present disclosure may include a display including a touch panel for detecting at least one input, a short range communication circuit configured to perform communication with an electronic pen for making a pen input to the touch panel, and a processor that is electrically connected to the touch panel and the short range communication circuit, and the processor is configured to obtain information on the pen input through the short range communication circuit, and if a difference between a detection time of an input to the touch panel and an obtainment time of information corresponds to a time range, determine the input as the pen input.

According to another aspect of the present disclosure, the information on the pen input may include pressure information of the pen input, and the processor may be configured to output the pen input on the display by using the input and the pressure information.

According to another aspect of the present disclosure, the processor may be configured to, if the difference between the detection time of the input and the obtainment time of information does not correspond to the time range, determine the input as a touch input.

According to another aspect of the present disclosure, the processor may be configured to change the time range, based on the difference between the detection time of the input and the obtainment time of information.

According to another aspect of the present disclosure, the processor may be configured to, if an input area of the input corresponds to an area range, determine the input as the pen input.

According to another aspect of the present disclosure, the processor may be configured to change the area range, based on the input area of the input.

According to another aspect of the present disclosure, the processor may be configured to obtain coordinate information, area information, or a change in an electric charge information on the input or a combination thereof.

According to another aspect of the present disclosure, information on the pen input may include switch state information, and the processor may be configured to delete the pen input, which is output on the display, by using the input and the switch state information.

According to an aspect of the present disclosure, the processor may be configured to, if a change in a change in an electric charge in the touch panel due to the input to the touch panel corresponds to a change range, determine the input to the touch panel as a hovering input.

According to an aspect of the present disclosure, the processor may be configured to, if a plurality of inputs to the touch panel are obtained, determine an input, which is obtained at a time closest to the obtainment time of the information on the pen input, of the plurality of inputs as the pen input.

According to an aspect of the present disclosure, the processor may be configured to execute different functions in correspondence to the pen input and the touch input, respectively.

According to another aspect of the present disclosure, the electronic device may further include a memory in which an application is stored, and the processor may be functionally connected to the memory and may be configured to, if the pen input for the application is obtained while the application is executed, execute a function corresponding to the pen input through the application.

Figure 4:
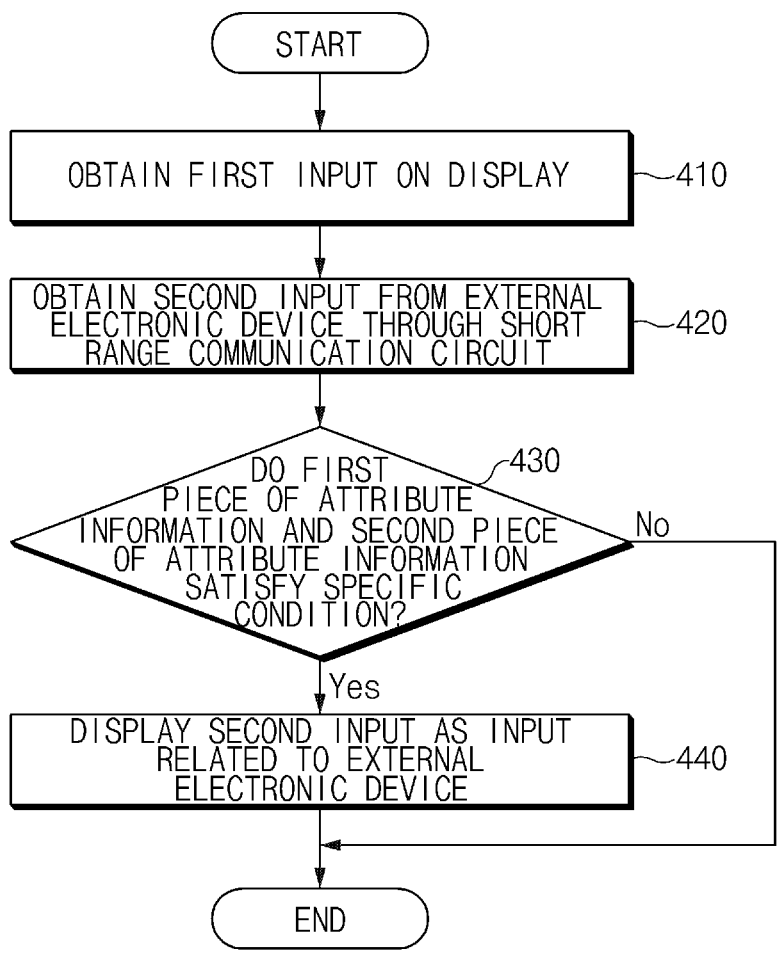
FIG. 4 illustrates a flowchart of a method for identifying an input of an electronic device according to various embodiments of the present disclosure.

FIG. 4 illustrates a method for identifying an input of an electronic device according to various embodiments of the present disclosure.

The flowchart of FIG. 4 may include operations that are processed by the electronic device 201 (for example, the processor 250) of FIG. 2. Accordingly, the contents about the electronic device 201 (for example, the processor 250) of FIG. 2 may be applied to the flowchart of FIG. 4 even if they are omitted in the following.

Referring to FIG. 4, in operation 410, the electronic device 201 (for example, the processor 250), for example, may obtain a first input through the display 230. The electronic device 201 may obtain a first input by an external electronic device 202 or a conductor such as a finger of the user through the display 230. The electronic device 201 may obtain a first piece of attribute information corresponding to the first input. The first piece of attribute information, for example, may include a time at which the first input is made, an area of the first input, a change in an electric charge for the first input measured by the display 230, or a combination thereof.

In operation 420, the electronic device 201 (for example, the processor 250), for example, may obtain a second input from the external device 202 through the short range communication circuit 240. The electronic device 201, for example, may obtain a second input from the external electronic device 202 when an input is applied by the external electronic device 202. The second input may include an input that is related to an intensity of a contact between the display 230 and the external electronic device 202. The input related to the intensity of the contact, for example, may include a tip-pressure including a pressure that is related to a tip of the external electronic device 202. The electronic device 201 may obtain a second piece of attribute information corresponding to the second input. The second piece of attribute information, for example, may include a time at which the second input is made.

In operation 430, the electronic device 201 (for example, the processor 250), for example, may determine whether the first piece of attribute information corresponding to the first input or the second piece of attribute information corresponding to the second input satisfies a specific condition. For example, the electronic device 201 may determine whether a difference between the time at which the first input is made and the time at which the second input is made falls within a specific range.

If it is determined in operation 430 that the first piece of attribute information and the second piece of attribute information satisfies a specific condition, the electronic device 201 (for example, the processor 250) may perform operation 440. In operation 440, the electronic device 201, for example, may display the second input as an input related to the external electronic device 202. Because a difference between the time at which the first input is made and the time at which the second input is made may be small if the second input is an input related to the external electronic device 202, the electronic device 201 may display the second input as an input related to the external electronic device 202 if the first piece of attribute information and the second piece of attribute information satisfy the specific condition.

In operation 430, when the first piece of attribute information and the second piece of attribute information do not satisfy the specific condition, the electronic device 201 (for example, the processor 250), for example, may not display the second input as an input related to the external electronic device. Because a difference between the time at which the first input is made and the time at which the second input is made may be large if the second input is an input that is not related to the external electronic device 202, the electronic device 201 may not display the second input as an input related to the external electronic device 202 if the first piece of attribute information and the second piece of attribute information do not satisfy the specific condition do not satisfy the specific condition.

Figure 5:
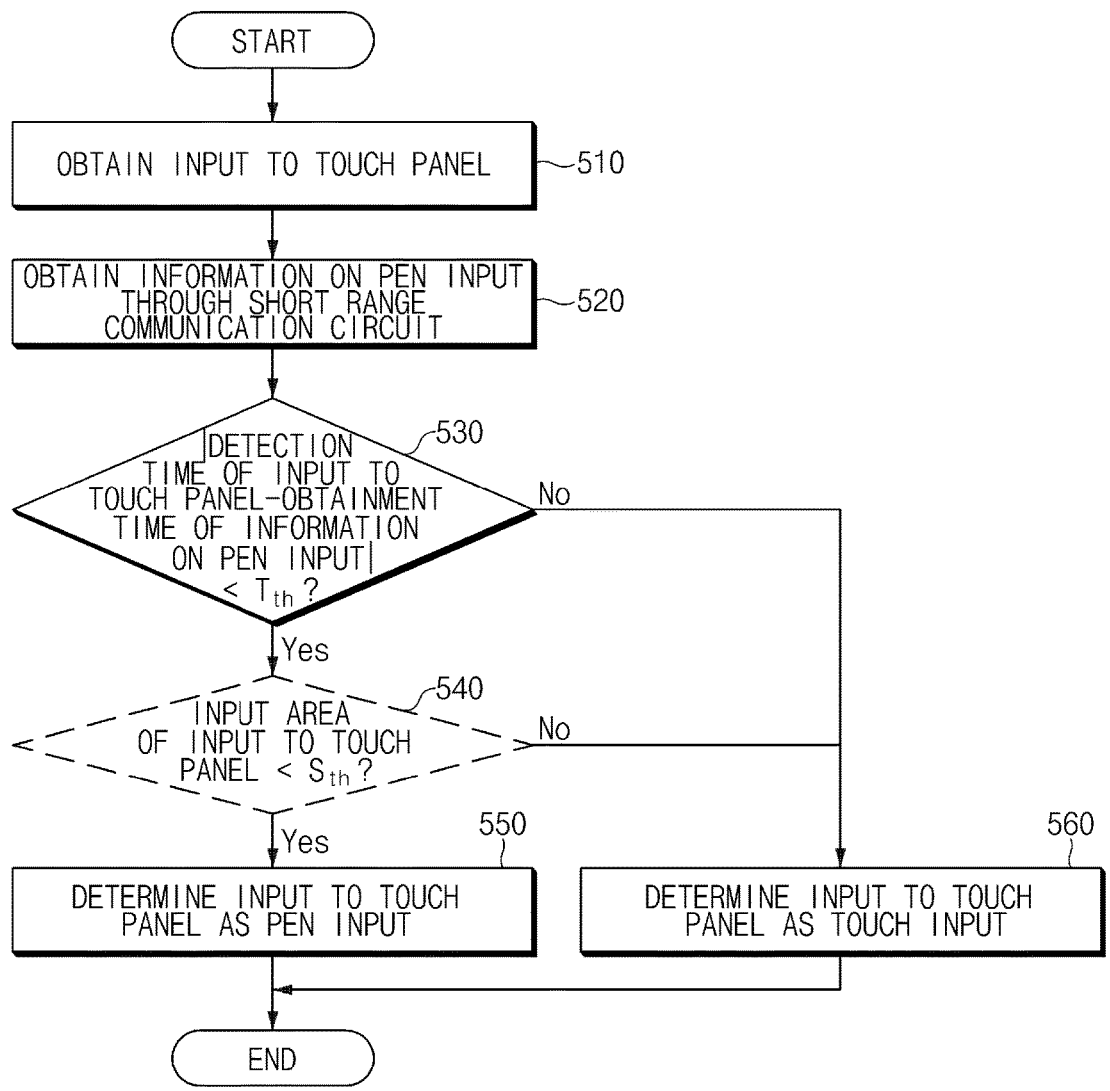
FIG. 5 illustrates a flowchart of a method for identifying an input of an electronic device according to various embodiments of the present disclosure.

FIG. 5 illustrates a flowchart of a method for identifying an input of an electronic device according to various embodiments of the present disclosure.

The flowchart of FIG. 5 may include operations that are processed by the electronic device 101 of FIG. 1. Accordingly, the contents about the electronic device 101 of FIG. 1 may be applied to the flowchart of FIG. 5 even if they are omitted in the following.

Referring to FIG. 5, in operation 510, the electronic device 101 (for example, the processor 140), for example, may obtain an input to the touch panel 120. The electronic device 101 may obtain an input by an electronic pen 102 or a conductor such as a finger of the user through the touch panel 120. The electronic device 101 may obtain coordination information, area information, or a change in an electric charge change information of the input.

In operation 520, the electronic device 101 (for example, the processor 140), for example, may obtain information on the pen input through the short range communication circuit 150. The electronic device 101 may obtain information on a pen input including pressure information or switch state information from the electronic pen 102 through the short range communication circuit 150. For example, one pen input is applied by the electronic pen 102, the electronic device 101 may receive coordinate information and/or area information of the pen input through the touch panel 120 (operation 410), and may receive pressure information of the pen input through the short range communication circuit 150 (operation 420).

In operation 530, the electronic device 101 (for example, the processor 140) may determine whether a difference between a time at which the input is made and a time at which information on the pen input is obtained falls within a specific time range. Because the electronic device 101 obtains a pen input and a touch input through the touch panel 120, an operation of distinguishing a pen input and a touch input may be required to execute different functions for the pen input and the touch input. The electronic device 101 may compare a time at which the input is made through the touch panel 120 and a time at which the information obtained through the short range communication circuit 150 is obtained to distinguish the pen input and the touch input. For example, the electronic device 101 may determine whether the difference between the time at which the input is made and the time at which the information on the pen input is obtained is smaller than a time range $T_{th}$.

In operation 540, the electronic device 101 (for example, the processor 140) may determine whether the input area of the input corresponds to a specific area range.

Because the pen input may has a small input area as compared with a touch input, the electronic device 101 may distinguish the pen input and the touch input by using an input area. In particular, when the electronic device 101 supports a multi-touch, it may be difficult to distinguish a pen input and a touch input only with a difference between a time at which an input is made and a time at which information on the pen input is obtained. Accordingly, the electronic device 101 may distinguish a pen input and a touch input by using an input area of the input together with the difference between the times.

For example, when two or more inputs, the number of the inputs, of which the difference between the times corresponds to the specific time range, is two or more the electronic device 101 (for example, the processor 140) may determine whether the inputs are pen inputs, based on the input area. For example, the electronic device 101 may determine whether the input area is smaller than $S_{th}$.

Operation 540 is an operation that is selectively performed, the electronic device 101 may determine whether an input is a pen input, through operation 530, and in this case, operation 540 may be omitted.

If an absoluter value of a difference between a time at which an input is made and a time at which information on a pen input is obtained corresponds to a specific time range (|Input detection time point−Obtainment time point of information on pen input|≤$T_{th}$) in operation 530 and an input of the input corresponds to a specific area range (an input area of an input<$S_{th}$) in operation 540, the electronic device 101 (for example, the processor 140) may perform operation 550. In operation 550, the electronic device 101 (for example, the processor 140) may determine the input as a pen input. Because a time at which an input is made and a time at which information on a pen input is obtained may be close to each other if the input is a pen input, the electronic device 101 (for example, the processor 140) may determine an input, a difference between the times of which corresponds to a time range (for example, $T_{th}$), of the inputs as a pen input. For example, when the difference between the times is smaller than $T_{th}$, the electronic device 101 may determine the input as a pen input.

If an absolute value of a difference between a time at which an input is made and a time at which information on a pen input is obtained does not correspond to a specific time range in operation 530 or an input of the input does not correspond to a specific area range (an input area of an input>$S_{th}$) in operation 540, the electronic device 101 (for example, the processor 140) may perform operation 560. In operation 560, the electronic device 101 (for example, the processor 140) may determine the input as a touch input. Because a time at which an input is made and a time at which information on a pen input is obtained may be far from each other if the input is a touch input, the electronic device 101 (for example, the processor 140) may determine an input, a difference between the times of which does not correspond to a time range (for example, $T_{th}$), of the inputs as a touch input. For example, when the difference between the times is larger than $T_{th}$, the electronic device 101 may determine the input as a touch input.

Figure 6:
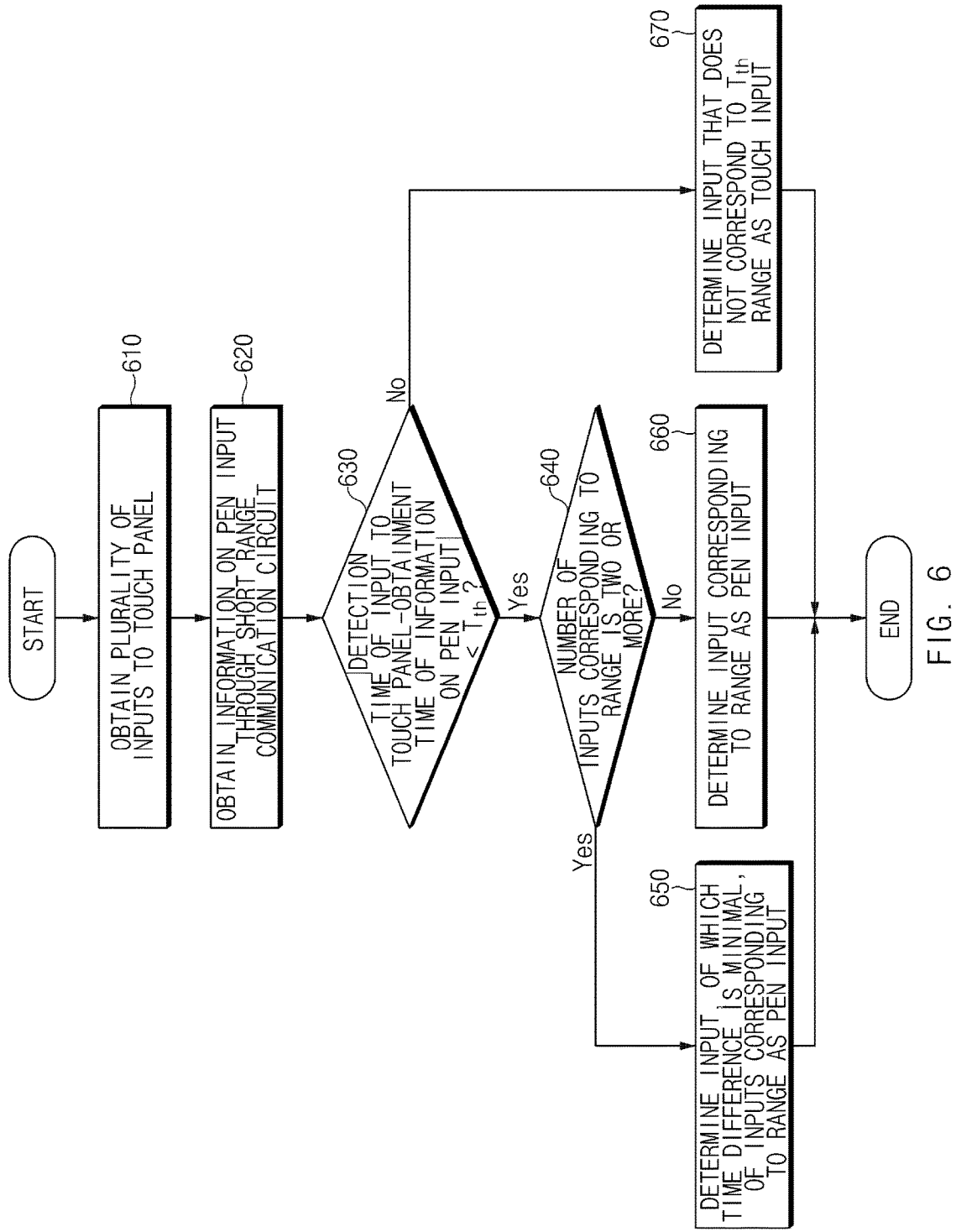
FIG. 6 illustrates a flowchart of an input identifying method for an electronic device according to various embodiments of the present disclosure.

FIG. 6 illustrates a flowchart of an input identifying method for an electronic device according to various embodiments of the present disclosure.

The flowchart of FIG. 6 may include operations that are processed by the electronic device 101 of FIG. 1. Accordingly, the contents about the electronic device 101 of FIG. 1 may be applied to the flowchart of FIG. 6 even if they are omitted in the following.

Referring to FIG. 6, in operation 610, the electronic device 101 (for example, the processor 140) may obtain a plurality of inputs to the touch panel 120.

In operation 620, the electronic device 101 (for example, the processor 140) may obtain information on the pen input through the short range communication circuit 150.

In operation 630, the electronic device 101 (for example, the processor 140) may determine whether differences between times at which the plurality of inputs are made and times at which information on the pen input is obtained fall within a specific time range. For examples, when input A, input B, and input C are obtained as the inputs for the touch panel 120, the electronic device 101 may calculate a difference between a time at which input A is made and a time at which information on a pen input is obtained, a difference between a time at which input B is made and a time at which information on a pen input is obtained, and a difference between a time at which input C is made and a time at which information on a pen input is obtained. The electronic device 101 may determine whether the calculated differences are smaller than $T_{th}$.

In operation 640, the electronic device 101 (for example, the processor 140) may determine whether the number of the inputs corresponding to the specific range is two or more. For example, when it is determined that the differences between the times for input A, input B, and input C correspond to the specific range, the electronic device 101 may determine whether the number of inputs of input A, input B, and input C, which correspond to the specific time range, is two or more.

In operation 650, when the number of the inputs corresponding to the specific time range is two or more, the electronic device 101 (for example, the processor 140) may determine an input of the two or more inputs, in which the difference between a time at which the input is made and a time at which information on a pen input is minimal as a pen input. For example, when the inputs corresponding to the specific time range are input A and input C, the electronic device 101 may determine an input that is input at a time closer to a time at which information on the pen input is obtained as a pen input.

In operation 660, when one input corresponds to the specific time range, the electronic device 101 (for example, the processor 140) may determine the one input as a pen input. Because the one input is an input, of which the difference between a time at which the input is made and a time at which the information on the pen input is obtained is minimal when the one input corresponds to the specific time range, the electronic device 101 may determine the corresponding input as a pen input.

In operation 670, if the differences between the times at which a plurality of inputs are made and the time at which the information on the pen input is obtained do not correspond to the specific time range, the electronic device 101 (for example, the processor 140) may determine an input that does not correspond to the specific time range as a touch input.

Figure 7:
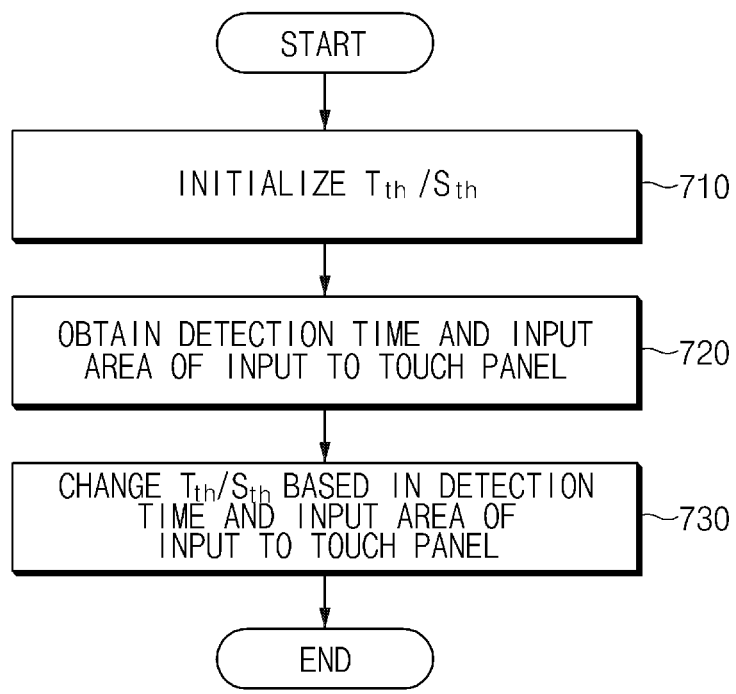
FIG. 7 illustrates a flowchart of an input identifying method for an electronic device according to various embodiments of the present disclosure.

FIG. 7 illustrates a flowchart of an input identifying method for an electronic device according to various embodiments of the present disclosure. For example, FIG. 7 is a flowchart illustrating a method for changing a specific time range or an area range by the electronic device 101.

The flowchart of FIG. 7 may include operations that are processed by the electronic device 101 (for example, the processor 140) of FIG. 1. Accordingly, the contents about the electronic device 101 (for example, the processor 140) of FIG. 1 may be applied to the flowchart of FIG. 7 even if they are omitted in the following.

Referring to FIG. 7, in operation 710, the electronic device 101 (for example, the processor 140), for example, may initialize the specific time range (for example, $T_{th}$) or the specific area range (for example, $S_{th}$). For example, the electronic device 101 (for example, the processor 140) may change $T_{th}$ or $S_{th}$ to a preset initial value at a specific time interval. As another example, the electronic device 101 (for example, the processor 140) may change $T_{th}$ or $S_{th}$ to a preset initial value when the electronic device 101 is rebooted.

According to an embodiment, the electronic device 101 (for example, the processor 140) may change the time range $T_{th}$ or $S_{th}$ to a preset initial value, based on an external input (for example, a user input). For example, the electronic device 101 (for example, the processor 140) may receive a user input (for example, a touch) by using a user interface that is displayed through the display, and may initialize the specific time range $T_{th}$ or $S_{th}$, based on the received information (for example, an initialization command).

In operation 720, the electronic device 101 (for example, the processor 140) may obtain a detection time and an input area of the input. For example, the electronic device 101 may use a detection time of the input that is used in operation 430 of FIG. 4 to obtain an input time of the input. Further, the electronic device 101 may use the obtainment time of the information on the pen input used in operation 430 of FIG. 4. Meanwhile, the electronic device 101 may use an input area of the input that is used in operation 540 of FIG. 5 to obtain an input area of the input.

In operation 730, the electronic device 101 (for example, the processor 140) may change the specific time range $T_{th}$ or the specific area range $S_{th}$, based on the detection time and the input area of the input. For example, the electronic device 101 may decrease $T_{th}$ when a difference value between the detection time of the input and the obtainment time of the information on the pen input is smaller than $T_{th}$, and may increase $T_{th}$ when the difference value between the detection time of the input and the obtainment time of the information on the pen input is greater than $T_{th}$. As another example, the electronic device 101 may decrease when the input area of the input is smaller than $S_{th}$, and may increase $S_{th}$ when the input area of the input is greater than $S_{th}$.

An exemplary equation for changing the specific time range $T_{th}$ or the specific area range $S_{th}$ is as follows.

$$T_{th}=aT+bT_{th0}(a+b=1)$$

$$S_{th}=cS+dS_{th0}(c+d=1) \quad \text{[Equation 1]}$$

Here, T is a difference between the detection time of the pen input and the obtainment time of the information on the pen input, $T_{th0}$ is an initial value of the specific time range, a and b are constants for endowing added values, and $T_{th}$ is a changed time range value. S is an input area of the pen input, $S_{th0}$ is an initial value of the specific area range, c and d are constants for endowing added values, and $S_{th}$ is a changed area range value.

The operations (for example, 410 to 450, 510 to 560, 610 to 670, or 710 to 730) described in the processes or method illustrated in FIGS. 4 to 7 may be executed through a sequential, parallel, repetitive, or heuristic method. For example, the operations may be executed in another sequence, some operations may be omitted, or other operations may be added.

Figure 8:
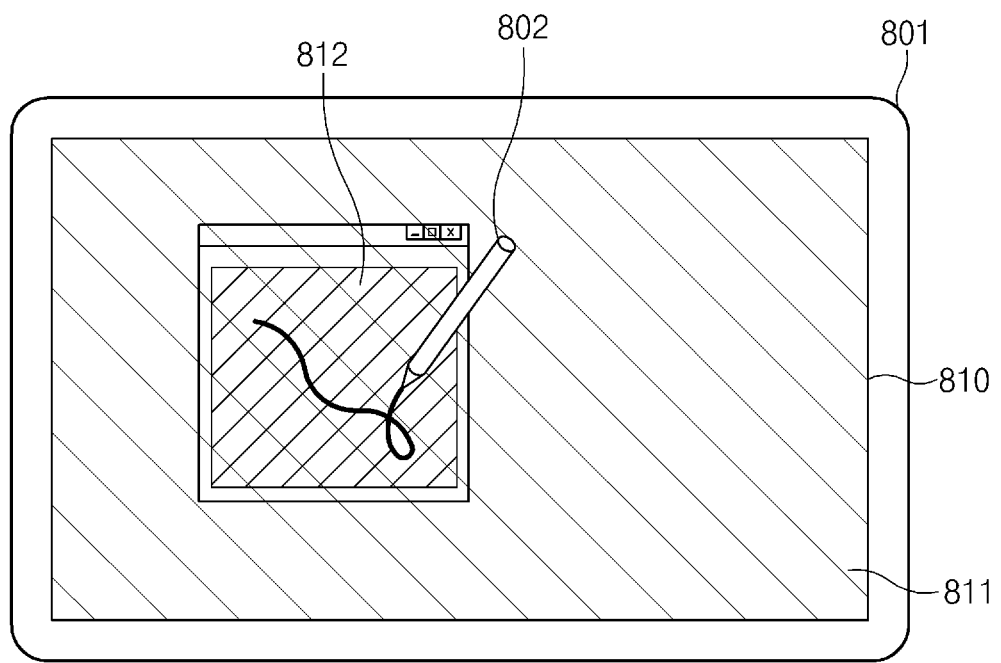
FIG. 8 illustrates an exemplary embodiment that is implemented by an input identifying method according to various embodiments of the present disclosure.

FIG. 8 illustrates an exemplary embodiment that is implemented by an input identifying method according to various embodiments of the present disclosure.

Referring to FIG. 8, the display 810 of the electronic device 801 (for example, the processor 140 or the processor 250) may receive an input by the electronic pen 802. The display 810 may display an execution window of a third party application in area 812 that corresponds to at least a portion of the total area 811.

According to an embodiment, when an input by the electronic pen 802 is applied onto the total area 811 of the display 810, the electronic device 801 may obtain coordinate and/or area information of the input through the touch panel or may obtain pressure information through the short range communication circuit. The electronic device 801 may compare an obtainment time of the coordinate and area information and an obtainment time of the pressure information to determine a pressure applied by the electronic pen 802 as a pen input. For example, the electronic device 801 may determine whether the input corresponds to a pen input or a touch input by using a touch panel driver and/or a pen driver included in a kernel. That is, the electronic device 801 may determine an input applied onto the total area of the display 810 as a pen input or a touch input.

Accordingly, the electronic device 801 may determine an input by the electronic pen 802 as a pen input even when the input by the electronic pen 802 is applied to area 812 in which the execution window of the third party application is displayed. For example, when the input applied to area 812 is determined to be a pen input, the electronic device 801 may deliver the information on the pen input from the pen driver to the third party application through the ink platform. The electronic device 801 may execute a function corresponding to the pen input through the third party application. For example, when a pen input is received in area 812, the electronic device 801 may execute a drawing function in the third party application. The pen input displayed in area 812 may include a locus according to a coordinate of the pen input and/or a thickness according to a pressure (tip pressure) of the pen input.

As described above, as an input applied through the driver is determined to be a pen input or a touch input and a pen input or a touch input is delivered to an application through a platform provided by an operating system, a function corresponding to the pen input may be executed on the third party application as well as the preloaded application.

Figure 9:
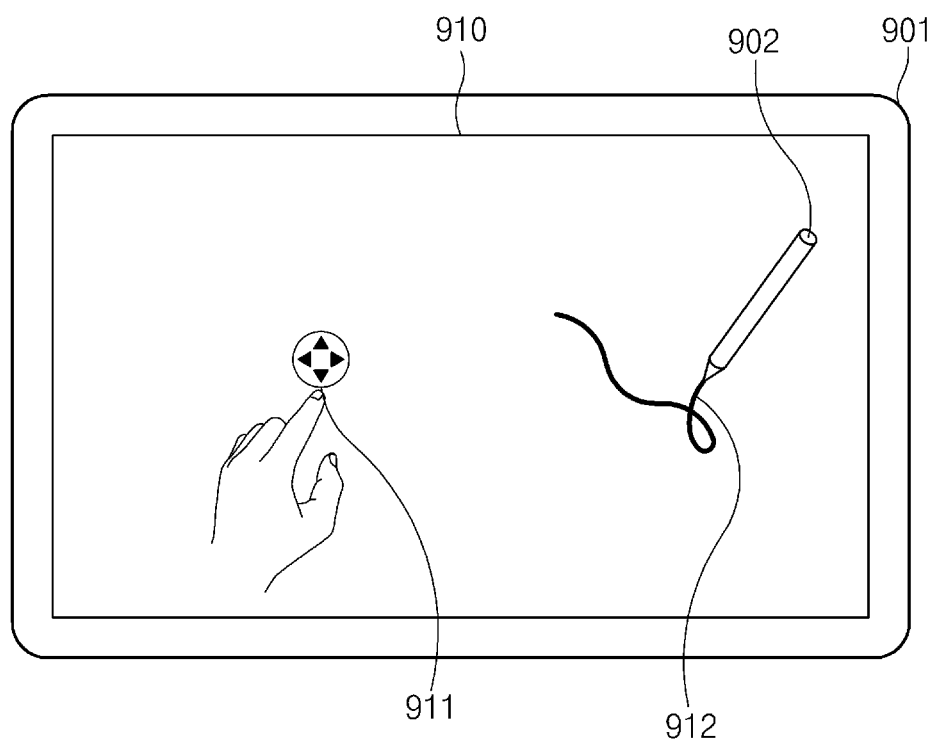
FIG. 9 illustrates an exemplary embodiment that is implemented by an input identifying method according to various embodiments of the present disclosure.

FIG. 9 illustrates an exemplary embodiment that is implemented by an input identifying method according to various embodiments of the present disclosure.

Referring to FIG. 9, the electronic device 901 (for example, the processor 140 or the processor 250) may receive a touch input 911 by a part of the body of the user and a pen input 912 by the electronic pen 902 through the display 910.

According to an embodiment, when a touch input and/or a pen input is applied onto the display 910, the electronic device 901 may obtain coordinate information on a touch input and/or a pen input through the touch panel, and may obtain pressure information on the pen input through the short range communication circuit (for example, the short range communication circuit 150 or the short range communication circuit 240). The electronic device 901 may compare an obtainment time of coordinate information on an input and an obtainment time of the pressure information to determine an input by a part of the body of the user as a touch input and an input by the electronic pen 902 as a pen input.

When a touch input 911 and a pen input 912 are received through the display 910, the electronic device 901 may execute different functions for the touch input 911 and the pen input 912, respectively. For example, the electronic device 901 may scroll a screen display on the display 910 according to the locus of the touch input 911. Meanwhile, the electronic device 901 may display a pen input 912 on the display 901 according to the locus of the pen input 912 by executing the drawing function. The pen input 912 displayed on the display 901 may be displayed thickly in a section of a high pressure and be displayed thinly in a section of a low pressure, based on the received pressure information. As another example, the electronic device 901 may display a menu bar on the display 910 in correspondence to the touch input 911. Meanwhile, when an additional pen input is received while a switch of the electronic pen 902 is on, the electronic device 901 may delete the pen input 912 displayed on the display 901 according to the locus of the additional pen input by executing an eraser function.

According to various embodiments, the electronic device may display at least a portion of the display 810 and 910 with at least one of a text, an image, an icon, a floating icon, a tile, or a widget, or may generate sound or vibration through an audio module or a motor (for example, a motor 1198 of FIG. 11) that is functionally connected to the electronic device. For example, the electronic device 801 and 901 (for example, the processor 140 or the processor 250) may display information (for example, a text, an image, an icon, a floating icon, a tile, or a widget) that is related to a touch input at least a portion of the display 810 and 910 in correspondence to the touch input. Further, the electronic device may change a manner of output to the outside by the electronic device related to the display 810 and 910, a color, a luminosity, a transparency, a display location, a size, contents displayed at least a portion of the display and a visual effect for the contents.

Figure 10:
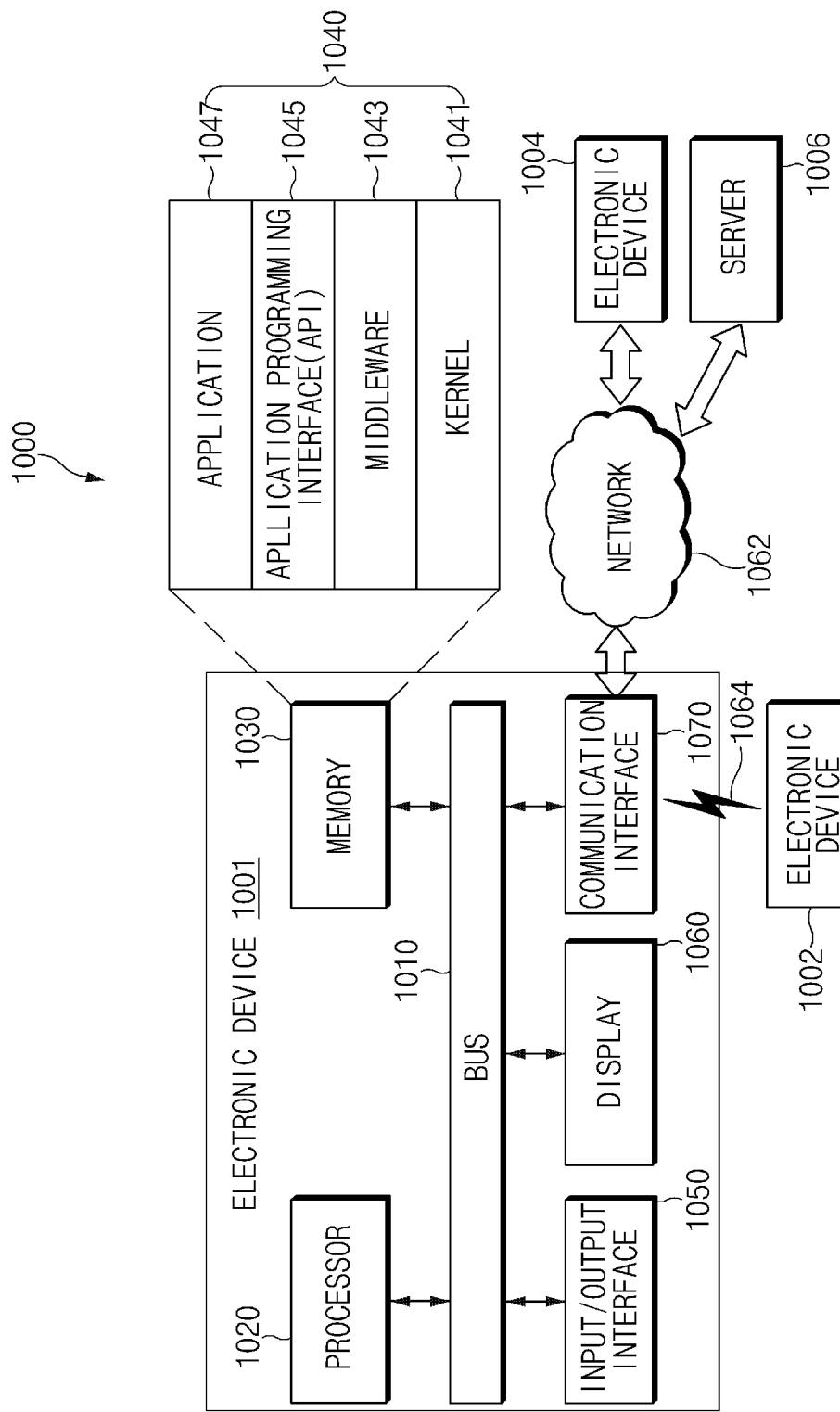
FIG. 10 illustrates an electronic device in a network environment according to various embodiments.

FIG. 10 illustrates an electronic device in a network environment 1000 according to various embodiments;

Referring to FIG. 10, the electronic device 1001, 1002, 1004 or the server 1006 according to various embodiments may be connected to each other through a network 1062 or a short range communication 1064. The electronic device 1001 may include a bus 1010, a processor 1020, a memory 1030, an input/output interface 1050, a display 1060, and a communication interface 1070. In some embodiments, the electronic device 1001 may exclude at least one of the elements or may additionally include another element.

The bus 1010, for example, may include a circuit that connects the elements 1010 to 170 and transfers communications (for example, control messages and/or data) between the elements.

The processor 1020 may include one or more of a central processing unit (CPU), an application processor (AP), or a communication processor (CP). The processor 1020, for example, may execute operations or data processing related to the control and/or communication of at least one other element of the electronic device 1001.

The memory 1030 may include a volatile and/or nonvolatile memory. The memory 1030, for example, may store commands or data related to at least one other element of the electronic device 1001. According to an embodiment, the memory 1030 may store software and/or a program 1040. The program 1040, for example, may include a kernel 1041, middleware 1043, an application programming interface (API) 1045, and/or an application program (or an application) 1047. At least some of the kernel 1041, the middleware 1043, or the API 1045 may be referred to as an operating system (OS).

The kernel 1041, for example, may control or manage system resources (for example, the bus 1010, the processor 1020, and the memory 1030) that are used to execute operations or functions implemented in the other programs (for example, the middleware 1043, the API 1045, or the applications 1047). The kernel 1041 may provide an interface through which the middleware 1043, the API 1045, or the applications 1047 access individual elements of the electronic device 1001 to control or manage the system resources.

The middleware 1043, for example, may function as an intermediary that allows the API 1045 or the applications 1047 to communicate with the kernel 1041 to exchange data.

The middleware 1043 may process one or more work requests received from the application programs 1047, according to their priorities. For example, the middleware 1043 may give a priority, by which a system resource (for example, the bus 1010, the processor 1020, or the memory 1030) of the electronic device 1001 may be used, to at least one of the application programs 1047. For example, the middleware 1043 may perform scheduling or load balancing for the one or more work requests by processing the one or more work requests according to the priority given to the at least one of the application programs 1047.

The API 1045 is an interface used, by the application 1047, to control a function provided by the kernel 1041 or the middleware 1043, and may include, for example, at least one interface or function (for example, an instruction), for example, for file control, window control, image processing, and text control.

The input/output interface 1050, for example, may function as an interface that may transfer commands or data that are input from the user or another external device to another element(s) of the electronic device 1001. The input/output interface 1050 may output commands or data received from another element(s) of the electronic device to the user or anther external device 1001.

The display 1060, for example, may include a liquid crystal display (LCD), a light emitting diode (LED) display, an organic light emitting diode (OLED) display, a microelectromechanical system (MEMS) display, or an electronic paper display. The display 1060, for example, may display various contents (for example, a text, an image, a video, an icon, and a symbol). The display 1060 may include a touch screen and receive, for example, a touch, a gesture, a proximity, or a hovering input using an electronic pen or the user's body.

The communication interface 1070, for example, may set communication between the electronic device 1001 and an external device (for example, a first external electronic device 1002, a second external electronic device 1004, or a server 1006). For example, the communication interface 1070 may be connected to a network 1062 through a wireless communication or a wired communication to communicate with the external device (for example, the second external electronic device 1004 or the server 1006).

The wireless communication is, for example, a cellular communication protocol, and, for example, may use at least one of long-term evolution (LTE), LTE-advanced (ATE-A), code division multiple access (CDMA), wideband CDMA (WCDMA), a universal mobile telecommunications system (UMTS), wireless broadband (WiBro), or a global system for mobile communications (GSM). Furthermore, the wireless communication, for example, may include a short range communication 1064. The short range communication 1064 may include at least one of WI-FI®, BLUETOOTH®, near field communication (NFC), magnetic stripe transmission (MST), or GNSS.

An MST may generate a pulse according to transmission data by using an electromagnetic signal, and the pulse may generate a magnetic field signal. The electronic device 1001 may transmit the magnetic field signal to a point of sales (POS), detect the magnetic field signal by using an MST reader, and restore the data by converting the detected magnetic signal into an electrical signal.

The GNSS may include at least one of, for example, a global positioning system (GPS), a global navigation satellite system (GLONASS), a BEIDOU navigation satellite system (hereinafter, "BEIDOU"), or the European global satellite-based navigation system (GALILEO), according to an in-use area or a bandwidth. Hereinafter, in the present disclosure, the "GPS" may be interchangeably used with the "GNSS". The wired communication may include at least one of, for example, a universal serial bus (USB), a high definition multimedia interface (HDMI), recommended standard-232 (RS232), and a plain old telephone Service (POTS). The network 1062 may include at least one of communication networks, for example, a computer network (for example, a LAN or a WAN), the Internet, or a telephone network.

The first and second external electronic devices 1002 and 1004 may be the same or different type devices from the electronic device 1001. According to an embodiment, the server 1006 may include a group of one or more servers. According to various embodiments of the present disclosure, all or some of the operations executed by the electronic device 1001 may be executed by another or a plurality of electronic devices (for example, the electronic devices 1002 and 1004 or the servers 1006). According to an embodiment of the present disclosure, when the electronic device 1001 should execute some functions or services automatically or upon request, it may request at least some functions associated with the functions or services from another device (for example, the electronic devices 1002 and 1004 or the server 1006), in place of or in addition to directly executing the functions or services. The other electronic device (for example, the electronic device 1002 or 1004 or the server 1006) may execute a requested function or an additional function, and may transfer the result to the electronic device 1001. The electronic device 1001 may process the received result directly or additionally, and may provide a requested function or service. To this end, for example, the cloud computing, distributed computing, or client-server computing technologies may be used.

Figure 11:
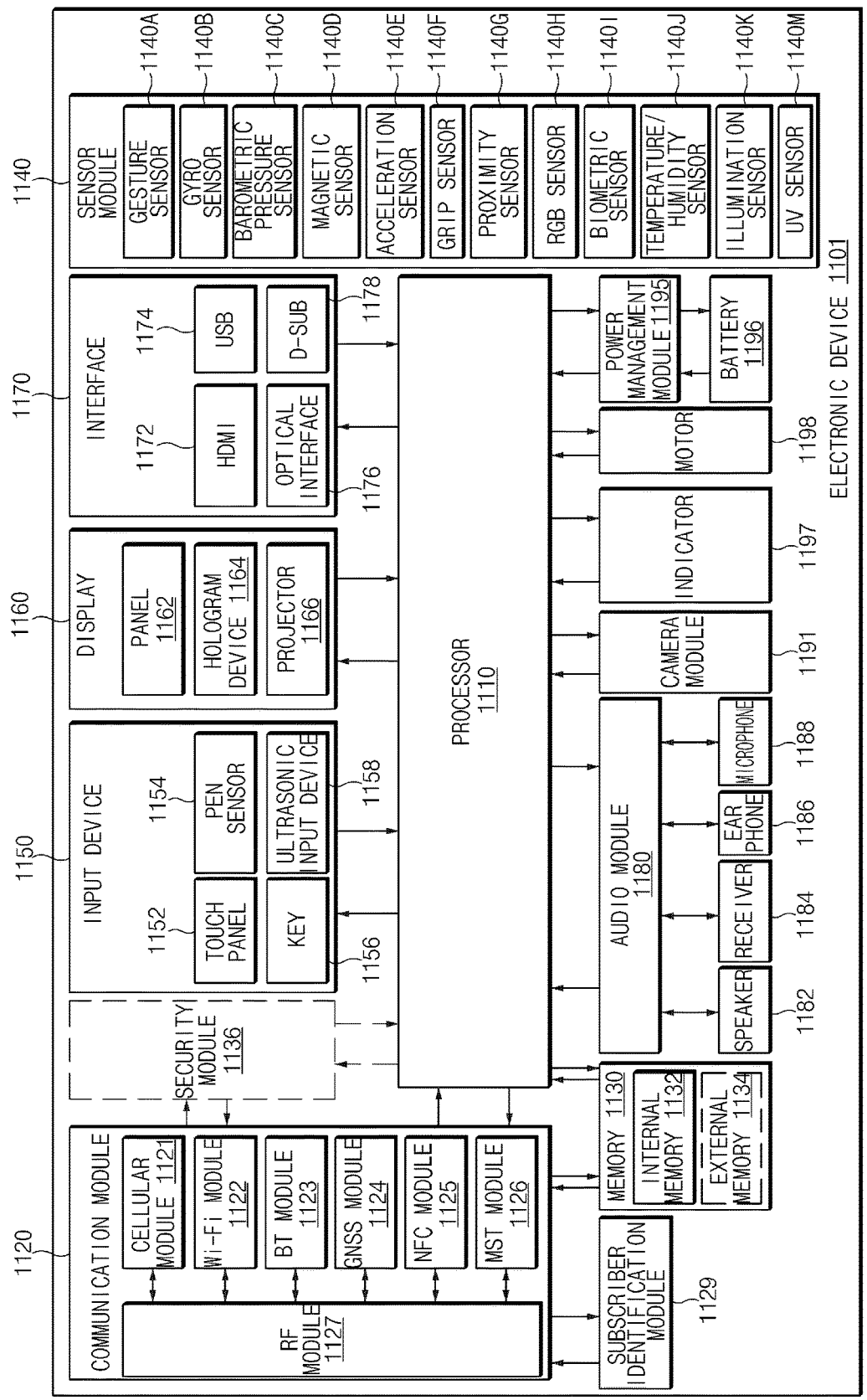
FIG. 11 illustrates an electronic device according to various embodiments.

FIG. 11 illustrates a block diagram of an electronic device 1101 according to various embodiments.

Referring to FIG. 11, an electronic device 1101 may include, for example, the whole part or a part of the electronic device 1001 illustrated in FIG. 10. Referring to FIG. 1101, the electronic device 31 may include at least one processor (for example, an application processor (AP) 1110), a communication circuit 1120, a subscriber identification circuit (SIM) card 1124, a memory 1130, a sensor circuit 1140, an input device 1150, a display 1160, an interface 1170, an audio circuit 1180, a camera circuit 1191, a power management circuit 1195, a battery 1196, an indicator 1197, or a motor 1198.

The processor 1110 may control a plurality of hardware or software elements connected to the processor 1110 by driving an operating system or an application program and perform a variety of data processing and calculations. The processor 1110 may be implemented by, for example, a System on Chip (SoC). According to an embodiment, the processor 1110 may further include a graphical processing unit (GPU) and/or an image signal processor. The processor 1110 may include at least some (for example, a cellular circuit 1121) of the elements illustrated in FIG. 11. The processor 1110 may load instructions or data, received from at least one other element (for example, a non-volatile memory), in a volatile memory to process the loaded instructions or data, and may store various types of data in a non-volatile memory.

The communication circuit 1120 may have the same or similar structure to the communication interface 1070 of FIG. 10. The communication circuit 1120 may include, for example, a cellular circuit 1121, a WI-FI® circuit 1122, a BLUETOOTH® circuit 1123, a GNSS circuit 1124 (for example, a GPS circuit, a GLONASS circuit, a BEIDOU circuit, or a GALILEO circuit), an NFC circuit 1125, and a radio frequency (RF) circuit 1126.

The cellular circuit 1121 may provide a voice call, a video call, a text message service, or an Internet service through, for example, a communication network. According to an embodiment, the cellular circuit 1121 may distinguish between and authenticate electronic devices 1101 within a communication network using a subscriber identification circuit (for example, the SIM card 1129). According to an embodiment, the cellular circuit 1121 may perform at least some of the functions that the processor 1110 may provide. According to an embodiment, the cellular circuit 1121 may include a communication processor (CP).

Each of the WI-FI® circuit 1122, the BLUETOOTH® circuit 1123, the GNSS circuit 1124, the NFC circuit 1125, or the MST circuit 1126, for example, may include a processor for processing data transmitted/received through the corresponding circuit. According to some embodiments, at least some (for example, two or more) of the cellular circuit 1121, the WI-FI® circuit 1122, the BLUETOOTH® circuit 1123, the GNSS circuit 1124, and the MST circuit 1125 may be included in one Integrated Chip (IC) or IC package.

The RF circuit 1127 may transmit/receive, for example, a communication signal (for example, an RF signal). The RF circuit 1127 may include, for example, a transceiver, a power amp module (PAM), a frequency filter, a low noise amplifier (LNA), or an antenna. According to another embodiment, at least one of the cellular circuit 1121, the WI-FI® circuit 1122, the BLUETOOTH® circuit 1123, the GNSS circuit 1124, the NFC circuit 1125, or the MST circuit may transmit and receive an RF signal through a separate RF circuit.

The subscriber identification circuit 1129 may include, for example, a card including a subscriber identification circuit and/or an embedded SIM, and may further include unique identification information (for example, an integrated circuit card identifier (ICCID)) or subscriber information (for example, international mobile subscriber identity (IMSI)).

The memory 1130 (for example, the memory 1030) may include, for example, an internal memory 1132 or an external memory 1134. The internal memory 1132 may include at least one of, for example, a volatile memory (for example, a dynamic random access memory (DRAM), a static RAM (SRAM), a synchronous dynamic RAM (SDRAM), and the like) and a non-volatile memory (for example, a one-time programmable read only Memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 1134 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1134 may be functionally and/or physically connected to the electronic device 1101 through various interfaces.

The security circuit 1136 is a circuit including a storage space having a relatively high security level as compared with the memory 1130, and may be a circuit that guarantees a safe data storage and a protected execution environment. The security circuit 1136 may be implemented by a separate circuit, and may include a separate processor. The security circuit 1136, for example, may be present in a detachable smart chip or a secure digital (SD) card, or may include an embedded secure element (eSE) embedded in a fixed chip of the electronic device 1101. Further, the security circuit 1136 may be driven by an operation system (OS) that is different form t the operating system of the electronic device 1101. For example, the security circuit 1136 may be operated based on a java card open platform (JCOP) operating system.

The sensor circuit 1140 may measure, for example, a physical quantity or detect an operation state of the electronic device 1101, and may convert the measured or detected information to an electrical signal. The sensor circuit 1140 may include at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (for example, red, green, and blue (RGB) sensor), a biometric sensor 1140I, a temperature/humidity sensor 1140J, an illumination sensor 1140K, and a Ultra Violet (UV) sensor 1140M. Additionally or alternatively, the sensor circuit 1140 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor circuit 1140 may further include a control circuit for controlling one or more sensors included therein. In some embodiments, the electronic device 1101 may further include a processor configured to control the sensor circuit 1140 as a part of or separately from the processor 1110, and may control the sensor circuit 1140 while the processor 1110 is in a sleep state.

The input device 1150 may include, for example, a touch panel 1152, a (digital) pen sensor 1154, a key 1156, or an ultrasonic input device 1158. The touch panel 1152 may use at least one of, for example, a capacitive type, a resistive type, an infrared type, and an ultrasonic type. The touch panel 1152 may further include a control circuit. The touch panel 1152 may further include a tactile layer, and provide a tactile reaction to a user.

The (digital) pen sensor 1154 may include, for example, a recognition sheet which is a part of the touch panel or a separate recognition sheet. The key 1156 may include, for example, a physical button, an optical key, or a keypad. The ultrasonic input device 1158 may detect ultrasonic waves generated by an input tool through a microphone (for example, a microphone 1188) and may identify data corresponding to the detected ultrasonic waves.

The display 1160 (for example, the display 1060) may include a panel 1162, a hologram device 1164, or a projector 1166. The panel 1162 may include an element equal or similar to the display 1060 of FIG. 10. The panel 1162 may be implemented to be, for example, flexible, transparent, or wearable. The panel 1162 may be formed as a single circuit together with the touch panel 1152. The hologram device 1164 may show a three dimensional image in the air using an interference of light. The projector 1166 may display an image by projecting light onto a screen. The screen may be located, for example, in the interior of or on the exterior of the electronic device 1101. According to an embodiment, the display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature (D-sub) 1178. The interface 1170 may be included in, for example, the communication interface 1070 illustrated in FIG. 10. Additionally or alternatively, the interface 1170 may include, for example, a mobile high-definition link (MHL) interface, a secure digital (SD) card/multimedia card (MMC) interface, or an infrared data association (IrDA) standard interface.

The audio circuit 1180 may bilaterally convert, for example, a sound and an electrical signal. At least some elements of the audio circuit 1180 may be included in, for example, the input/output interface 1050 illustrated in FIG. 10. The audio circuit 1180 may process voice information input or output through, for example, a speaker 1182, a receiver 1184, earphones 1186, or the microphone 1188.

The camera circuit 1191 is a device which may photograph a still image and a dynamic image. According to an embodiment, the camera module 291 may include one or more image sensors (for example, a front sensor or a back sensor), a lens, an Image Signal Processor (ISP) or a flash (for example, an LED or xenon lamp).

The power management circuit 1195 may manage, for example, power of the electronic device 1101. According to an embodiment of the present disclosure, the power management circuit 1195 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 1196, and a voltage, a current, or a temperature while charging. The battery 1196 may include, for example, a real change in an electric chargeable battery and/or a solar battery.

The indicator 1197 may indicate particular status of the electronic device 1101 or a part thereof (for example, the processor 1110), for example, a booting status, a message status, a charging status, or the like. The motor 1198 may convert an electrical signal into mechanical vibrations, and may generate a vibration or haptic effect. Although not illustrated, the electronic device 1101 may include a processing device (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow (MEDIA-FLO™).

Each of the elements described in the specification may include one or more components, and the terms of the elements may be changed according to the type of the electronic device. In various embodiments of the present disclosure, the electronic device may include at least one of the elements described in the specification, and some elements may be omitted or additional elements may be further included. Some of the elements of the electronic device according to various embodiments of the present disclosure may be coupled to form one entity, and may perform the same functions of the corresponding elements before they are coupled.

Figure 12:
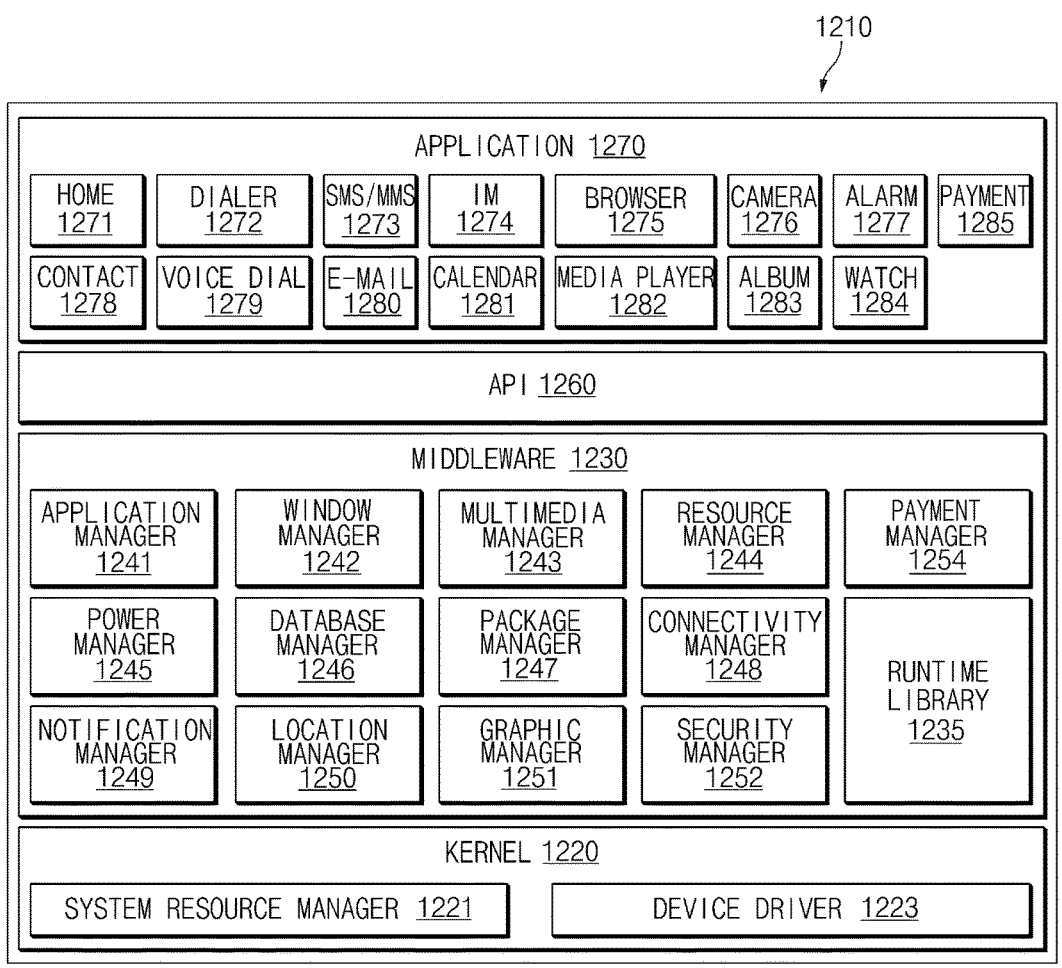
FIG. 12 illustrates a program module according to various embodiments.

FIG. 12 illustrates a block diagram of a program module according to various embodiments.

According to an embodiment, the program module 1210 (for example, a program 1040) may include an operating system (OS) that controls resources related to an electronic device, and various application programs (for example, an application program 1047) that is driven on an operating system. The operating system may be, for example, ANDROID®, iOS®, WINDOWS®, SYMBIAN OS®, TIZEN®, SAMSUNG BADA®, or the like.

The program module 1210 may include a kernel 1220, a middleware 1230, an API 1260, or applications 1270. At least a part of the program module 1210 may be preloaded on an electronic device or may be downloaded from external electronic devices (for example, external electronic devices 1002 and 1004 and a server 1006).

The kernel 1220 (for example, the kernel 1041) may include, for example, a system resource manager 1221, a device driver 1223, a touch panel driver 1225, and a pen driver 1227. The system resource manager 1221 may control, allocate, or retrieve the system resources. According to one embodiment, the system resource manager 1221 may include a process management unit, a memory management unit, or a file system management unit. The device driver 1223 may include, for example, a display driver, a camera driver, a Bluetooth driver, a shared-memory driver, a USB driver, a keypad driver, a Wi-Fi driver, an audio driver, or an Inter-Process Communication (IPC) driver. The touch panel driver 1225 and the pen driver 1227 may be included in the device driver 1223.

The middleware 1230 may provide a function required by the applications 870 in common or provide various functions to the applications 1270 through the API 1260 so that the applications 1270 can efficiently use limited system resources of the electronic device. According to an exemplary embodiment, the middleware 1230 (for example, the middleware 1043) may include, for example, at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, or a payment manager 1254.

The run time library 1235 may include, for example, a library module that a compiler uses in order to add new functions through a programming language while the applications 1270 are executed. The run time library 1235 may perform input/output management, memory management, or a function for an arithmetic function.

The application manager 1241, for example, may manage a lifecycle of at least one of the applications 1270. The window manager 1242 may manage a GUI resource used in a screen. The multimedia manager 1243 may detect a format required for reproducing various media files and encode or decode a media file using a codec appropriate for the corresponding format. The resource manager 1244 may manage resources, such as a source code, a memory, or a storage space, of at least one of the applications 1270.

The power manager 1245 may operate together with, for example, a basic input/output system (BIOS), so as to manage a battery or power and may provide power information required for the operation of the electronic device. The database manager 1246 may generate, search for, or change a database to be used by at least one of the applications 1270. The package manager 1247 may manage the installation or the updating of applications distributed in a package file form.

For example, the connectivity manager 1248 may manage wireless connections, such as WI-FI® or BLUETOOTH®. The notification manager 1249 may display or notify an event such as a received message, an appointment, a proximity notification, and the like to a user without disturbance. The location manager 1250 may manage location information of the electronic device. The graphic manager 1251 may manage graphic effects to be provided to a user and user interfaces related to the graphic effects. The security manager 1252 may provide various security functions required for system security or user authentication. According to an embodiment of the present disclosure, when the electronic device (for example, the electronic device 1001) has a phone function, the middleware 1230 may further include a telephony manager for managing a voice or video communication function of the electronic device.

The middleware 1230 may include a middleware module for forming a combination of various functions of the aforementioned elements. The middleware 1230 may provide modules specialized according to the type of OS in order to provide differentiated functions. In addition, some existing elements may be dynamically removed from the middleware 1230, or new elements may be added to the middleware 1230.

The API 1260 (for example, the API 1045) is, for example, a set of API programming functions, and may be provided another configuration according to an operating system. For example, for each platform, one API set may be provided in a case of Android or iOS, and two or more API sets may be provided in a case of Tizen.

The application 1270 (for example, the application program 1047) may include, for example, a home 1271, a dialer 1272, an SMS/MMS 1273, an instant message (IM) 1274, a browser 1275, a camera 1276, an alarm 1277, a contact 1278, a sound dial 1279, an e-mail 1280, a calendar 1281, a media player 1282, an album 1283, a clock 1284, or at least one application that may provide health care (for example, measuring an exercise degree or blood glycose) or environmental information.

According to an embodiment, the application 1270 may include an application (hereinafter, referred to as "an information exchange application for convenience of description") that supports exchange of information between the electronic device (for example, the electronic device 1001) and external electronic device (for example, the external electronic device 1002 and 1004). The information exchange application may include, for example, a notification relay application for forwarding specific information to an external electronic device, or a device management application for managing an external electronic device.

For example, the notification relay application may have a function of forwarding, to external electronic devices (for example, the electronic devices 1002 and 1004), notification information generated from other applications of the electronic device (for example, an SMS/MMS application, an e-mail application, a health care application, and an environmental information application). The notification relay application may receive notification information from, for example, an external electronic device and provide the received notification information to a user.

The device management application may, for example, manage (for example, install, delete, or update) a function for at least a part of an external electronic device (for example, the electronic device 1002 or 1004) communicating with the electronic device 10 (for example, activating/deactivating the external electronic device itself (or some components thereof) or adjusting the brightness (or resolution) of a display), an application operating in the external electronic device, or a service provided from the external electronic device (for example, a telephone call service or a message service).

According to an embodiment, the application 1270 may include an application (for example, a health management application) designated according to an attribute of an external electronic device (for example, an electronic device 1002 or 1004). According to an embodiment, the application 1270 may include an application that is received from an external electronic device (for example, the server 1006 or the device 1002 or 1004). According to an embodiment of the present disclosure, the applications 1270 may include a preloaded application or a third party application that is downloaded from a server. The names of the elements of the program module 1210 according to the illustrated embodiment may vary according to the type of the operating system.

According to various embodiments, at least a part of the program module 1210 may be implemented by software, firmware, hardware, or two or more combinations thereof. At least a part of the program module 1210, for example, may be implemented (for example, executed) by a processor (for example, the processor 1110). At least a part of the program module 1210 may include, for example, a module, a program routine, a set of instructions, or a process for performing at least one function.

The term "module" used in the specification may mean a unit including, for example, one of hardware, software, or firmware or a combination of the two or more of them. The module may be interchangeably used, for example, with a unit, logic, a logical block, a component, or a circuit. The module may be a minimum unit or a part of an integrally configured part. The module may be a minimum unit or a part which performs one or more functions. The module may be implemented mechanically or electromagnetically. For example, the module may include at least one of an application-specific integrated circuit (ASIC) chip, a field-programmable gate array, or a programmable-logic device, which has been known, will be developed in the future, or performs certain operations.

At least some of the devices (for example, modules or functions) or methods (for example, operations) according to various embodiments of the present disclosure may be implemented by an instruction stored in a computer-readable storage medium, for example, in the form of a program module. When the instruction is executed by the processor (for example, the processor 1020), the at least one processor may perform a function corresponding to the instruction. The computer-readable storage medium may be, for example, a memory 1030.

The computer-readably storage medium may include a hard disk, a floppy disk, a magnetic medium (for example, a magnetic tape), an optical medium (for example, a compact disk read only memory (CD-ROM)), a digital versatile disk (DVD), a magneto-optical medium (for example, a floptical disk), a hardware device (for example, a read only memory (ROM), a random access memory (RAM), or a flash memory). Further, the program instructions may include high-level language codes which may be executed by a computer using an interpreter as well as machine languages created by using a compiler. The above-mentioned hardware device may be configured to be operated as one or more software module to perform operations of various embodiments, and the converse is true.

The module or program module according to various embodiments of the present disclosure may include at least one of the above-mentioned elements, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added.

According to various embodiments of the present disclosure, production costs of an electronic device may be reduced and the thickness of the electronic device may be decreased by recognizing a pen input by an electronic pen, by using a touch panel without using an additional piece of hardware for receiving the pen input.

In addition, various functions may be provided through pen inputs, by distinguishing inputs to a touch panel into a pen input and a touch input by using information that is received through a short range communication from an electronic pen.

In addition, the present disclosure may provide various effects that are directly or indirectly recognized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a display including a touch panel configured to detect at least one input;
   a short range communication circuit of the electronic device configured to communicate with an electronic pen configured to make a pen input to the touch panel; and
   a processor that is electrically connected to the touch panel and the short range communication circuit, wherein the processor is configured to:
   detect a first input using the touch panel,
   obtain information on the pen input through the short range communication circuit,
   when a difference between a detection time of the first input to the touch panel and an obtainment time of information on the pen input corresponds to a time range and when a touch area size of the first input is less than a threshold area size, determine the input to the touch panel as the pen input, and
   when the pen input is determined, update the threshold area size based on the touch area size of the first input,
   wherein the processor is further configured to, when a plurality of inputs to the touch panel are obtained, determine an input, which is obtained at a time closest to the obtainment time of the information on the pen input and of which a touch area size is less than the updated threshold area size, of the plurality of inputs as the pen input.

2. The electronic device of claim 1, wherein the information on the pen input comprises pressure information of the pen input, and
   wherein the processor is configured to output the pen input on the display by using the first input to the touch panel and the pressure information.

3. The electronic device of claim 1, wherein the processor is configured to determine the first input to the touch panel as a touch input when the difference between the detection time of the input to the touch panel and the obtainment time of information on the pen input does not correspond to the time range.

4. The electronic device of claim 1, wherein the processor is configured to change the time range based on the difference between the detection time of the first input to the touch panel and the obtainment time of information on the pen input.

5. The electronic device of claim 1, wherein the processor is configured to obtain coordinate information, area information, or electric charge information on the first input to the touch panel or a combination thereof.

6. The electronic device of claim 1, wherein the information on the pen input comprises switch state information, and
   wherein the processor is configured to delete the pen input, which is output on the display, by using the first input to the touch panel and the switch state information.

7. The electronic device of claim 1, wherein the processor is configured to determine the first input to the touch panel as a hovering input when a change in an electric charge in the touch panel due to the first input to the touch panel corresponds to a change range.

8. The electronic device of claim 3, wherein the processor is configured to execute a first function corresponding to the pen input and a second function corresponding to the touch input.

9. The electronic device of claim 1, further comprising:
   a memory configured to store an application,
   wherein the processor is functionally connected to the memory and is configured to execute a function corresponding to the pen input through the application when the pen input for the application is obtained while the application is executed.

10. A method for identifying an input of an electronic device, the method comprising:
   detecting a first input to a touch panel of the electronic device;
   obtaining information on a pen input to the electronic device from an electronic pen;
   determining the first input as the pen input when a difference between a detection time of the input to the electronic device and a obtainment time of information on the pen input corresponds to a time range and when a touch area size of the first input is less than a threshold area size;
   update the threshold area size based on the touch area size of the first input; and
   when a plurality of inputs to the touch panel are obtained, determining an input, which is obtained at a time closes to the obtainment time of the information on the pen input and of which a touch area size is less than the updated threshold area size, of the plurality of inputs as the pen input.

11. The method of claim 10, wherein the information on the pen input comprises pressure information of the pen input, and the method further comprising, when the input to the electronic device is determined to be the pen input, outputting the pen input on a display by using an input to the electronic device and the pressure information.

12. The method of claim 10, further comprising:

changing the time range based on the difference between the detection time of the first input to the electronic device and the obtainment time of information on the pen input.

13. The method of claim 10, wherein the information on the pen input comprises switch state information, and the method further comprising deleting the pen input, which is output on a display, by using the first input to the electronic device and the switch state information.

14. A computer-readable recording medium storing an instruction that is executed by at least one processor of an electronic device, the instruction, when executed by the at least one processor, causing the at least one processor to:

detecting a first input to a touch panel of the electronic device;

obtain information on a pen input to the electronic device from an electronic pen;

determine the first input to a touch panel as the pen input when a difference between a detection time of the input to the electronic device and a obtainment time of information on the pen input corresponds to a time range and when a touch area size of the first input is less than a threshold area size; and update the threshold area size based on the touch area size of the first input, wherein the instruction further causes the at least one processor to determine an input, which is obtained at a time closest to the obtainment time of the information on the pen input and of which a touch area size is less than the updated threshold area size, of a plurality of inputs as the pen input, when a plurality of inputs to the touch panel is obtained.

* * * * *